US012664157B1

(12) United States Patent
Seshadri et al.

(10) Patent No.: US 12,664,157 B1
(45) Date of Patent: Jun. 23, 2026

(54) MACHINE LEARNING-DRIVEN SYSTEM ARCHITECTURE AUTOMATION

(71) Applicant: Fannie Mae, Washington, DC (US)

(72) Inventors: Subra Seshadri, Broadlands, VA (US); Kiran Ramineni, Oakton, VA (US); Juliana Carroll, Pinehurst, NC (US); Bhavik Shah, Adie, VA (US); Vara Kuppam, Coppell, TX (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 19/032,884

(22) Filed: Jan. 21, 2025

(51) Int. Cl.
  *G06F 16/00* (2019.01)
  *G06F 16/242* (2019.01)
  *G06F 16/248* (2019.01)

(52) U.S. Cl.
  CPC ........ *G06F 16/2438* (2019.01); *G06F 16/248* (2019.01)

(58) Field of Classification Search
  CPC ............................ G06F 16/2438; G06F 16/248
  USPC ................................................ 707/600–899
  See application file for complete search history.

(56) References Cited

U.S. PATENT DOCUMENTS

| | | | |
|---|---|---|---|
| 11,429,352 B2 | 8/2022 | Pujar et al. | |
| 11,461,081 B2 | 10/2022 | Zhang | |
| 11,604,626 B1 | 3/2023 | Sawant et al. | |
| 11,604,628 B2 | 3/2023 | Ni et al. | |
| 11,656,867 B2 | 5/2023 | Singh et al. | |
| 11,688,193 B2 | 6/2023 | Wang et al. | |
| 11,899,566 B1 | 2/2024 | Singh et al. | |
| 12,001,821 B2 | 6/2024 | Ni et al. | |
| 12,061,678 B2 | 8/2024 | Davis et al. | |
| 12,254,272 B1 * | 3/2025 | Cetoli ..................... | G06F 40/40 |
| 12,517,936 B1 * | 1/2026 | Yates .................. | G06F 16/3344 |
| 2023/0062297 A1 | 3/2023 | Eloul et al. | |
| 2024/0028317 A1 | 1/2024 | Plotnik et al. | |
| 2024/0121125 A1 * | 4/2024 | Blair ....................... | G06F 40/58 |
| 2025/0148209 A1 * | 5/2025 | Jadhav .................. | G06F 40/284 |
| 2025/0217341 A1 * | 7/2025 | Titus ................... | G06F 16/2237 |
| 2025/0258814 A1 * | 8/2025 | Tiwari ............... | G06F 16/2438 |
| 2025/0272091 A1 * | 8/2025 | Baker ...................... | G06F 8/71 |
| 2025/0291854 A1 * | 9/2025 | Ho .......................... | G06F 16/93 |
| 2025/0363372 A1 * | 11/2025 | Azmandian .......... | G06N 3/0895 |

* cited by examiner

*Primary Examiner* — Michelle N Owyang

(74) *Attorney, Agent, or Firm* — Michael Best & Friedrich LLP

(57) ABSTRACT

A system includes non-transitory computer-readable media storing instructions and an electronic processor configured to execute the instructions to receive a query from a user device, generate a query embedding based on the query, select artifact embeddings from a set of artifact embeddings based on a closeness between each artifact embedding and the query embedding, the query embedding and the set of artifact embeddings being in a same feature space, retrieve a knowledge graph from a data store, the knowledge graph including nodes representing artifacts corresponding to the selected artifact embeddings and edges representing semantic relationships between the artifacts, provide an input including a representation of the query, the selected artifact embeddings, and the knowledge graph to a generative model to generate an output, and transmit the output to the user device.

22 Claims, 11 Drawing Sheets

1100

1102 — Preprocess query

1104 — Generate query embedding

1106 — Perform initial filtering based on tags

1108 — Perform similarity matching between query embedding and artifact embeddings 1110 — Retrieve relevant artifact embeddings

MACHINE LEARNING-DRIVEN SYSTEM ARCHITECTURE AUTOMATION

FIELD

The present disclosure relates to computer architecture and software automation and, more particularly, to computer architecture and software hyper-automation using machine learning solutions implemented with artificial intelligence and generative artificial intelligence technologies.

SUMMARY

Manual computer architecture design often results in technical errors and inefficiencies because architects may need to synthesize numerous artifacts—which may be spread across multiple data sources and be in various data formats (such as, for example, unstructured, semi-structured, and structured data formats)—to ensure that the computer architecture being designed is compliant with relevant design standards, integrates smoothly with existing computer systems, and/or adheres to best practices. Artifacts may be items (such as files or data from the data stores) containing pieces of information that describe, capture, implement, or otherwise relate to previous design decisions, system requirements, implementation details, compliance standards, and/or other relevant details related to existing computer architectures. Examples of artifacts may include design patterns, technical specifications, legacy system documentation, security guidelines, and performance benchmarks, among others.

Artifacts may guide the design of a computer architecture by providing a foundation of existing knowledge and design choices for the new computer architecture to be built upon. For example, design patterns may offer proven solutions to recurring architectural problems, ensuring that common challenges like scalability or fault tolerance are addressed effectively. Compliance standards described in artifacts may ensure that the computer architecture adheres to legal and organizational requirements, while legacy system documentation helps architects understand how to integrate new components without disrupting existing systems. Performance benchmarks and technical specifications may provide valuable insights into system constraints and optimal configurations. By synthesizing these artifacts, architects can align their designs with best practices, avoid redundant mistakes, and ensure that new computer architectures are both technically sound and compatible with broader system ecosystems.

However, manually finding and synthesizing relevant artifacts is a challenging and error-prone task. As computer architectures grow more complex, the number of relevant artifacts may increase, making it difficult to identify which ones are most applicable to the current design. Architects often need to sift through vast amounts of information stored in disparate data stores, each containing different formats and levels of detail. Without automated tools to assist in retrieving and integrating these artifacts, the design process may be inefficient and prone to oversight. Missing or misinterpreting key artifacts can lead to non-compliant designs, integration failures, or the omission of critical considerations like scalability or security, ultimately introducing bugs and technical debt into the system.

Systems, apparatuses, methods, and techniques described in this specification provide technical solutions to these challenges (among others) by embedding artifacts and performing vector similarity comparisons with input queries to efficiently retrieve relevant artifacts. For example, instead of relying on keyword-based search mechanisms, which are often insufficient for capturing the nuanced relationships between user inputs and artifacts, embedding transforms both the input queries and the artifacts into high-dimensional vectors that capture their semantic meanings. By performing vector similarity comparisons, the system can identify artifacts that are contextually relevant to the input queries, even if the specific terminology differs. This process ensures that relevant artifacts—such as design patterns, performance metrics, compliance guidelines, etc., are accurately identified, significantly reducing the chances of missing critical information and improving the quality of the resulting architecture.

To further improve retrieval efficiency and precision, artifacts may be segmented into smaller chunks and tagged with metadata before performing the vector similarity comparisons. This segmentation allows the system to break down large or complex artifacts, such as detailed technical specifications or legacy system documentation, into more manageable and contextually focused parts. Each chunk may be tagged with metadata, such as keywords, topics, or categories, which facilitates an initial retrieval step based on semantic matching with the input query. The system can then perform a more focused vector similarity comparison on the most relevant chunks, rather than the entire artifact. This two-stage process not only reduces computational overhead by limiting the comparison to only the most relevant sections of each artifact, but it may also increase the accuracy of the retrieved information. The system's ability to prioritize specific chunks based on their tags ensures that only the most relevant portions of the artifacts may be considered, reducing the likelihood of irrelevant or incomplete information being retrieved.

Additionally, in some implementations, the systems, apparatuses, methods, and techniques described herein generate knowledge graphs to represent the structured relationships between various artifacts or portions of artifacts. Nodes within the knowledge graphs may represent artifacts or portions of artifacts, while edges may define the semantic relationships between the nodes. The nodes may be organized hierarchically, with parent nodes in higher levels supporting or governing child nodes at lower levels. The hierarchical structure of the knowledge graphs may capture dependencies between artifacts or portions of artifacts, while the edges may encode semantic relationships, such as how artifacts or portions of artifacts relate conceptually, functionally, procedurally, etc.

By combining hierarchical and semantic relationships, knowledge graphs provide comprehensive representations of interdependencies between artifacts or portions of artifacts. This structured context may be provided to downstream machine learning models (such as the generative models described herein), adding context to allow the models to reason over complex relationships and/or retrieve relevant information more effectively.

In some examples, the relationships within the knowledge graph are governed by a standardized ontology. Standardized ontologies may formalize the definition, structure, and governance of entities (for example, artifacts or portions of artifacts) and their interconnections. By adhering to a standardized ontology, knowledge graphs facilitate logical consistency, traceability, and dynamic reasoning for downstream machine learning models. For example, the knowledge graphs may facilitate logical consistency in downstream machine learning operations by ensuring that entities and relationships are uniformly defined and structured according to a common framework, reducing ambiguity and the likelihood of misinterpretation, which facilitates the knowledge graph serving as a reliable foundation for reasoning and decision making by downstream machine learning models.

Additionally, adhering to a standardized ontology facilitates traceability by providing a clear lineage of the relationships and dependencies between artifacts or portions of artifacts, allowing downstream machine learning models to track how information flows through system and identify origins of specific insights or decisions. Furthermore, the formalized structure of the knowledge graph (for example, as defined by the standardized ontology) supports dynamic reasoning by facilitating downstream machine learning models to infer new relationships, validate existing ones, and adapt to evolving contexts or queries, enhancing their ability to generate accurate, context-aware outputs from complex and interdependent data.

Once the relevant artifacts or chunks—and relevant knowledge graphs or relevant portions of knowledge graphs, in some examples—have been retrieved, a generative model, such as a large language model (LLM), may be employed to synthesize the information contained within these disparate and potentially unstandardized artifacts. Given the variability in how artifacts may be structured or formatted—especially when they originate from different systems or time periods—the generative model may play a critical role in unifying and interpreting this information. The generative model can produce coherent outputs that, for instance, answer specific questions about the architecture or generate new architectural designs by integrating data from multiple sources. For example, the generative model may generate a new architecture that adheres to established performance benchmarks, incorporates legacy system integration considerations, and complies with current security standards, all while addressing specific user-provided requirements. This automated synthesis of information may allow architects to efficiently generate comprehensive, compliant, and technically sound computer architectures without manually parsing and reconciling each artifact, significantly reducing errors and inefficiencies in the design process.

According to some examples, a system includes non-transitory computer-readable media storing instructions and an electronic processor configured to execute the instructions to receive a query from a user device, generate a query embedding based on the query, select artifact embeddings from a set of artifact embeddings based on a closeness between each artifact embedding and the query embedding, the query embedding and the set of artifact embeddings being in a same feature space, retrieve a knowledge graph from a data store, the knowledge graph including nodes representing artifacts corresponding to the selected artifact embeddings and edges representing semantic relationships between the artifacts, provide an input including a representation of the query, the selected artifact embeddings, and the knowledge graph to a generative model to generate an output, and transmit the output to the user device.

In other features, the electronic processor is further configured to execute the instructions to select a subset of the set of artifact embeddings based a tag of each artifact embedding and select artifact embeddings from the subset of artifact embeddings based on a closeness between each artifact embedding in the subset of artifact embeddings and the query embedding. In other features, the electronic processor is further configured to execute the instructions to select the subset of the set of artifact embeddings based on a similarity between the tag of each artifact embedding and a semantic content of the query.

In other features, the electronic processor is further configured to execute the instructions to segment each artifact in a set of artifacts into one or more chunks, generate a chunk embedding based on each chunk, and assign a tag to each chunk embedding. In other features, the electronic processor is further configured to execute the instructions to assign the tag to each chunk embedding based on a semantic content of the respective chunk.

In other features, each artifact embedding in the set of artifact embeddings is generated based on an artifact related to a computer architecture. In other features, each artifact embedding in the set of artifact embeddings is generated based on an artifact defining at least a portion of a computer architecture. In other features, the output defines at least a portion of a computer architecture. In other features, the output includes an artifact defining at least a portion of a computer architecture. In other features, the output includes at least a portion of computer code.

Other examples provide a method including receiving, with a machine learning platform, a query from a user device, generating, with the machine learning platform, a query embedding based on the query, selecting, with the machine learning platform, artifact embeddings from a set of artifact embeddings based on a closeness between each artifact embedding and the query embedding, the query embedding and the set of artifact embeddings being in a same feature space, retrieving, with the machine learning platform, a knowledge graph from a data store, the knowledge graph including nodes representing artifacts corresponding to the selected artifacts and edges representing semantic relationships between the artifacts, providing, with the machine learning platform, an input including a representation of the query, the selected artifact embeddings, and the knowledge graph to a generative model to generate an output, and transmitting, with the machine learning platform, the output to a user device.

In other features, the method includes selecting, with the machine learning platform, a subset of the artifact embeddings based on a tag of each artifact embedding and selecting, with the machine learning platform, artifact embeddings from the subset of artifact embeddings based on a closeness between each artifact embedding in the subset of artifact embeddings and the query embedding. In other features, the method includes selecting, with the machine learning platform, the subset of the set of artifact embeddings based on a similarity between the tag of each artifact embedding and a semantic content of the query.

In other features, the method includes segmenting, with the machine learning platform, each artifact in a set of artifacts into one or more chunks, generating, with the machine learning platform, a chunk embedding based on each chunk, and assigning, with the machine learning platform, a tag to each chunk embedding. In other features, the method includes assigning, with the machine learning platform, the tag to each chunk embedding based on a semantic content of the respective chunk.

In other features, each artifact embedding in the set of artifact embeddings is generated based on an artifact related to a computer architecture. In other features, each artifact embedding in the set of artifact embeddings is generated based on an artifact defining at least a portion of a computer architecture. In other features, the output defines at least a portion of a computer architecture. In other features, the output includes an artifact defining at least a portion of a computer architecture. In other features, the output includes at least a portion of computer code.

Other examples, embodiments, features, and aspects will become apparent by consideration of the detailed description and accompanying drawings.

BRIEF DESCRIPTION OF THE DRAWINGS

In the drawings, reference numbers may be reused to identify similar and/or identical elements.

DETAILED DESCRIPTION

Figure 1:
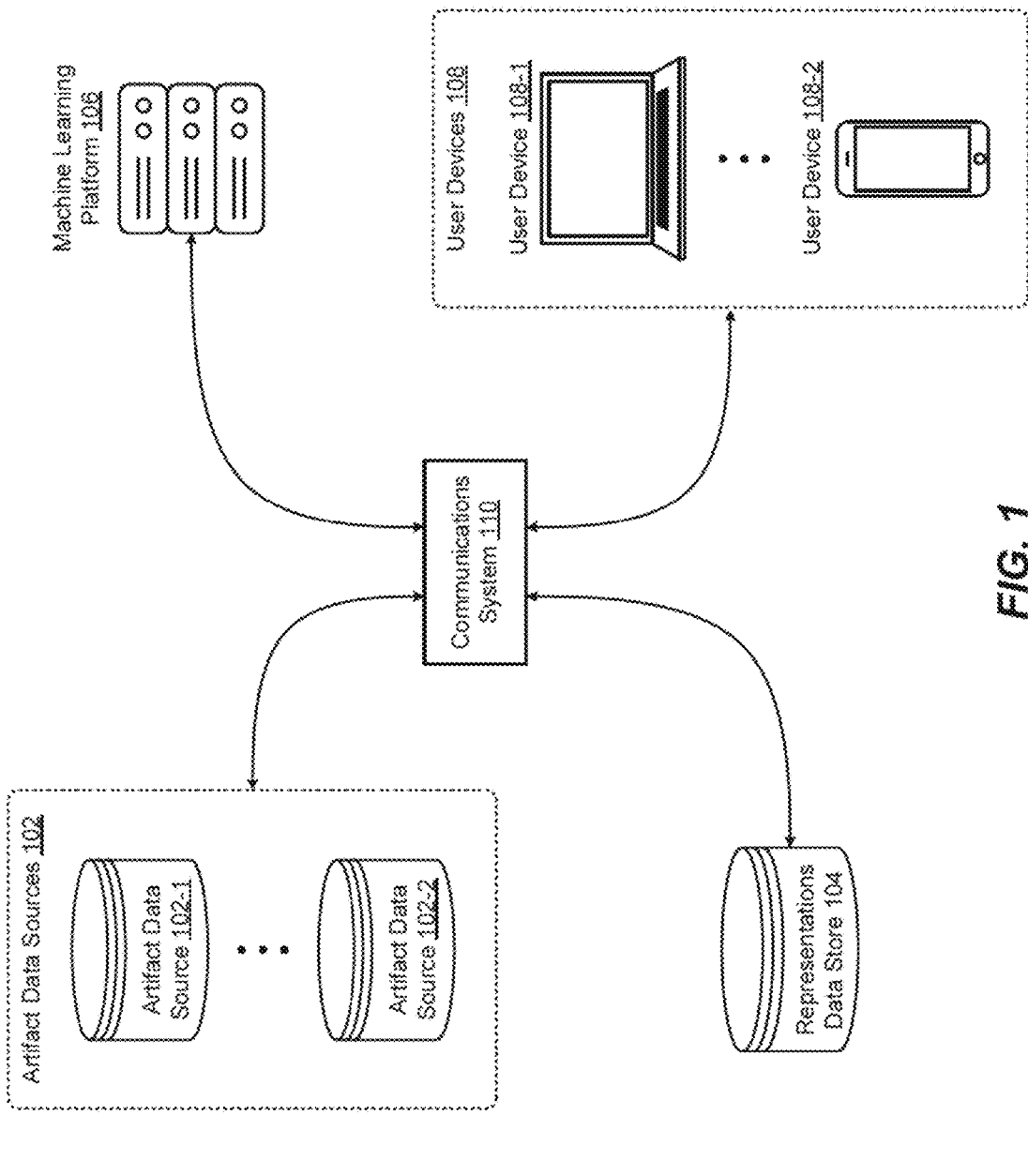
FIG. 1 is a block diagram illustrating an example computing system, according to some embodiments.

FIG. 1 is a block diagram illustrating an example computing system 100, according to some embodiments. As shown in FIG. 1, some examples of the system 100 include one or more artifact data stores 102 (such as artifact data stores 102-1 and 102-2), a representations data store 104, a machine learning platform 106, one or more user devices 108 (such as user devices 108-1 and 108-2), and/or a communications system 110. Although two artifact data stores 102, a single representations data store 104, a single machine learning platform 106, two user devices 108, and a single communications system 110 is shown in the example of FIG. 1, other implementations of the system 100 may include any number of each device, platform, database, and/or system. In the example of FIG. 1, the artifact data stores 102, the representations data store 104, the machine learning platform 106, and/or the user devices 108 may communicate with one another via the communications system 110.

Each artifact data store 102 may be a central repository that stores and/or manages one or more artifacts used in computer system architecture design. The artifacts may be stored in unstructured, semi-structured, and/or structured data formats. Each artifact data store 102 may be implemented in a variety of configurations, depending on the requirements of the system 100 and the scale of the deployment. Various implementations of the artifact data store 102 include non-transitory computer-readable storage media that stores artifacts, ensuring reliable and persistent access to critical design information. In some examples, the artifact data store 102 is deployed on a single computer or server located within an organization's premises. This on-premises deployment allows the organization to directly manage the artifact data store 102, offering increased control over data security and system configurations. Such implementations may be particularly advantageous for organizations with strict security requirements or operating environments where Internet connectivity is limited.

In various implementations, the artifact data store 102 is deployed across multiple servers, forming either a distributed system or a centralized architecture. In a distributed setup, the artifacts may be deployed to non-transitory computer-readable storage media partitioned across several servers, enhancing performance, scalability, and fault tolerance. These configurations may be particularly suitable for handling large volumes of artifacts, as it allows the artifact data store 102 to balance the load across servers and improve data retrieval speed. Additionally, a centralized server-based deployment may streamline access to the artifacts for smaller-scale applications while maintaining the use of non-transitory computer-readable storage media to persistently store and safeguard the artifacts.

In some examples, the artifact data store 102 is implemented in a cloud-based deployment. In these configurations, the artifact data store 102 leverages cloud storage services and scalable compute resources, allowing it to dynamically scale in response to increased or decreased demand. These implementations may also offer the flexibility of remote access, enabling system architects and users to retrieve artifacts from any location with Internet access. The cloud deployment also ensures that the artifacts are securely stored on non-transitory computer-readable media within the cloud infrastructure, providing both scalability and security for organizations managing large and diverse datasets.

In various implementations, artifact data store 102 is deployed in a hybrid model, where some artifacts (such as more sensitive artifacts) are stored on-premises while other artifacts (such as less critical data) is stored in the cloud. Hybrid configurations allow organizations to benefit from the security of local storage for highly sensitive data while taking advantage of the scalability and flexibility offered by cloud-based solutions. The non-transitory computer-readable storage media in both the on-premises and cloud portions of the hybrid deployment ensures persistent, reliable storage of the artifacts, regardless of where they are hosted. This combination provides both the control needed for sensitive data and the scalability required for broader use cases, ensuring the architecture remains flexible, secure, and efficient in retrieving necessary artifacts during the design process. Thus, the artifact data store 102 may include one or more artifacts. As previously described, artifacts may include concrete items produced, modified, and/or used during the development and/or maintenance of a computer architecture. Artifacts may include components of the computer architecture and/or items such as files that define, describe, and/or document at least a portion of the architecture.

In various implementations, artifacts stored at the artifact data stores 102 include system design artifacts. System design artifacts may include minimum viable architectures (MVAs), technology patterns, architecture profiles, data flow diagrams, and system component models. MVAs may represent the basic, functioning architecture necessary to meet a computing system's core requirements and may be the starting point for scaling and adding more complex features. Technology patterns may be reusable solutions that address common architectural challenges, such as scalability, fault tolerance, or performance optimization, ensuring consistency across different computer architecture projects. Architecture profiles may provide detailed documentation of a computer architecture across different technological layers, specifying how each component fits into an overall computing system. Data flow diagrams may visually represent how data moves through a computing system, illustrating inputs, processing stages, and outputs at various points. System component models may describe individual computing system components in detail, including their roles, interconnections, and dependencies, providing a clear understanding of the computer architecture's structure.

In some examples, artifacts stored at the artifact data stores 102 include data and knowledge artifacts. Data and knowledge artifacts may include policies, standards, procedures, process repositories, metadata for technological layers, configuration files, legacy system documentation, and performance benchmarks and technical specifications. Policies, standards, procedures, and process repositories may document the organizational rules and regulations that a computer architecture should comply with, ensuring consistency and alignment with industry or organizational best practices. Metadata for technological layers may describe technological layers within a computing system, such as databases, networks, and application servers, ensuring proper integration of components. Configuration files may store the necessary settings for deploying and operating software components, ensuring they function as intended. Legacy system documentation may provide historical context on previous computing system designs, guiding integration of new components without disrupting existing computing systems. Performance benchmarks and technical specifications may offer guidelines for optimal system performance and technical limitations, ensuring designs meet system targets.

In various implementations, artifacts stored at the artifact data stores 102 include infrastructure and support artifacts. Infrastructure and support artifacts may include infrastructure architecture diagrams, deployment diagrams, system performance metrics, and resiliency plans. Infrastructure architecture diagrams may visually represent physical and cloud infrastructure, including servers, networks, and storage systems that support computing system operations. Deployment diagrams may show how software components are distributed across hardware resources, offering a blueprint for implementing computer architectures. System performance metrics may track key indicators such as latency, throughput, and resource utilization, helping inform decisions on scalability and optimization. Resiliency plans may provide documentation on how a computing system handles failures and ensures high availability, including strategies for disaster recovery.

In some examples, artifacts stored at the artifact data stores 102 include security artifacts. Security artifacts may include vulnerability mappings, impact reports and visualizations, security architecture models, and compliance and risk documentation. Vulnerability mappings may link identified vulnerabilities to specific computing system components, helping architects mitigate risks during the design process. Impact reports and visualizations may detail the potential consequences of vulnerabilities, often including visual representations of the affected computing system components. Security architecture models may include diagrams and documentation that describe the security layers integrated into a computer architecture, such as firewalls, encryption, and access controls. Compliance and risk documentation may include information describing how to ensure that a computer architecture adheres to legal and regulatory requirements, outlining security risks and mitigation measures.

In various implementations, artifacts stored at the artifact data stores 102 include integration and interfacing artifacts. Integration and interfacing artifacts may include application programming interface (API) specifications, interface control documents (ICDs), and integration plans. API specifications may provide detailed documentation of a computing system's APIs, which define how different components communicate and exchange data. ICDs may specify how various subsystems or components interface with each other, ensuring clear data exchange and compatibility. Integration plans may provide documentation outlining how different computing systems, services, or components may be integrated to form a cohesive computer architecture.

In some examples, artifacts stored at the artifact data stores 102 include lifecycle management artifacts. Lifecycle management artifacts may include version control records, change management logs, maintenance and support plans, and testing plans and reports. Version control records may maintain a history of changes made to the architecture, allowing for tracking and rollback when appropriate. Change management logs may document changes to a computing system, including design modifications, updates, and new feature integrations. Maintenance and support plans may provide guidelines for maintaining computer architectures, including schedules for updates and procedures for handling system failures. Testing plans and reports may include strategies for testing a computer architecture, from unit tests to full system integration tests, ensuring the computer architecture performs as expected.

In various implementations, artifacts stored at the artifact data stores 102 include documentation and specification files used to define computer system requirements, policies, standards, and procedural guidelines. These artifacts may be stored as DOCX or DOC files for editable text-based documents or PDF files for finalized and consistent formatting across platforms. Plain text files, such as TXT, may also be used for basic configurations or lightweight documentation. Markdown (MD) files can be employed for technical documentation that requires simple formatting and version control compatibility.

In some examples, artifacts stored at the artifact data stores 102 include design and diagram files used to visually represent computing system architecture, data flow, and component interactions. These artifacts may be stored as VSDX files, or as SVG, PNG, or JPEG image formats for static visual representations. For standardized models, XML and UML formats may be used to store Unified Modeling Language (UML) diagrams, and BPMN files may document business process models. XMI may be employed to capture interchanges of UML model data.

In various implementations, artifacts stored at the artifact data stores 102 include code and script files that manage configurations, execute specific tasks, or define system behavior. These artifacts may be stored as SQL files for database management, or as PY, R, JS, JAVA, or C++ files for scripts and computing system components written in different programming languages. Configuration and data handling may use JSON or YAML files for structured data and settings. SH or BAT files are used for shell scripting and batch operations.

In some examples, artifacts stored at the artifact data stores 102 include configuration files that dictate system settings and behavior. These artifacts may be stored as INI files for basic configuration purposes, especially in software applications. Java properties files (PROPERTIES) are used to manage configuration settings in Java-based systems. YAML and JSON files may also be used for structured configurations, especially in modern cloud-native applications and deployment scenarios.

In various implementations, artifacts stored at the artifact data stores 102 include spreadsheet and data files used to document system metrics, technical specifications, and performance benchmarks. These artifacts may be stored as XLSX or XLS files for more complex datasets and analysis, while CSV files may be employed for exporting or managing tabular data in a lightweight and accessible format. TSV may also be used as an alternative to CSV for tab-separated values, and SQL DUMP files may store exported database contents for backup or migration purposes.

In some examples, artifacts stored at the artifact data stores 102 include presentation and reporting files that convey system designs, architecture reviews, or performance reports. These files may be stored as PPTX or PPT formats or as PDF files for consistent report dissemination. HTML files may be employed for web-based reports, especially those requiring interactive elements or dynamic content generation.

In various implementations, artifacts stored at the artifact data stores 102 include executable and binary files that facilitate the execution of specific software programs or computing system components. These files may be stored as JAR or WAR formats for Java-based deployments, or as EXE files. BIN files may store compiled code or data in binary format for efficient execution.

In some examples, artifacts stored at the artifact data stores 102 include archive and package files used to bundle multiple components of a computing system or project, often for distribution or deployment. These artifacts may be stored as ZIP, TAR, or GZ files to compress and archive multiple files, while ISO files may serve as disk images for larger software or computing system deployment.

In various implementations, artifacts stored at the artifact data stores 102 include log and monitoring files used to track computing system performance, errors, and transactions over time. These files may be stored as LOG files for raw event tracking or as CSV and TSV files for structured logging. HAR files may be used to capture HTTP Archive data for monitoring system performance at the request and response level.

In some examples, artifacts stored at the artifact data stores 102 include database and metadata files that store and manage structured data for computing system operations. These artifacts may be stored as DB, DBF, or MDB files for relational or flat-file databases, and as SQL scripts for schema definitions and data migrations. XML and JSON formats may be used to store metadata and facilitate structured data exchange between computing systems.

In various implementations, artifacts stored at the artifact data stores 102 include version control and configuration files serve as artifacts that manage computing system versions, dependencies, and continuous integration workflows. These files may include.gitignore files for specifying untracked content in Git repositories, YAML and JSON files for CI/CD pipeline configurations, and LOCK files for dependency management, such as package-lock.json for npm or Pipfile.lock for Python projects.

The representations data store 104 may be a central repository that stores and/or manages one or more high-dimensional vector representations, or embeddings, generated from various artifacts within artifact data stores 102. These embeddings may capture the semantic meaning of the artifacts and may be used to perform vector similarity comparisons, allowing the system 100 to retrieve contextually relevant artifacts in response to user input. Additionally, the representations data store 104 may store knowledge graphs that encode structured relationships between artifacts or portions of artifacts. For example, as previously described, these knowledge graphs may capture both hierarchical dependencies (e.g., parent-child relationships) and semantic relationships (e.g., functional, conceptual, or procedural connections) between entities, facilitating the system 100 to reason over complex interdependencies and to retrieve relevant artifacts with enhanced contextual understanding. Similar to the artifact data stores 102, the representations data store 104 can be implemented in various configurations depending on system requirements and deployment scale.

In various implementations, the representations data store 104 may reside on non-transitory computer-readable storage media within a single server or computer located on-premises. In some examples, the representations data store 104 may be deployed across multiple servers as part of a distributed or centralized architecture. In various implementations, the representations data store 104 may also be implemented as part of a cloud-based deployment, similar to artifact data store 102. In these examples, the embeddings are stored on non-transitory computer-readable storage media within a cloud infrastructure. In some examples, the representations data store 104 may also be deployed in a hybrid model, where some embeddings are stored on-premises while other embeddings are stored in the cloud.

The machine learning platform 106 may include one or more computing platforms that employ machine learning techniques—such as vector similarity comparisons and generative models—to retrieve, analyze, and synthesize relevant artifacts to generate and/or enhance computer architecture designs. The one or more computing platforms of machine learning platform 106 can be deployed in various configurations suited to different operational requirements. For example, the machine learning platform 106 may be deployed as a local server, multiple distributed servers, as part of a scalable cloud infrastructure, or any combination of these deployment models. Additional details associated with the machine learning platform 106 are described with reference to FIG. 2.

The user devices 108 may include any electronic device suitable for transmitting a query to the machine learning platform 106 and/or interacting with the machine learning platform 106. For example, the user devices 108 may include any combination of one or more personal computers (e.g., a desktop computer and/or a laptop computer), servers (e.g., a dedicated server and/or a virtual, cloud-based server), mobile devices (e.g., a smartphone and/or tablet), workstations, single-board computers (e.g., an Arduino and/or Raspberry Pi computer), virtual reality headsets, and/or augmented reality devices. In the example of FIG. 1, the system 100 includes a first user device 108-1 implemented as a personal computer and a second user device 108-2 implemented as a mobile device.

The communications system 110 may include one or more networks, such as a General Packet Radio Service (GPRS) network, a Time-Division Multiple Access (TDMA) network, a Code-Division Multiple Access (CDMA) network, a Global System of Mobile Communications (GSM) network, an Enhanced Data Rates for GSM Evolution (EDGE) network, a High-Speed Packet Access (HSPA) network, an Evolved High-Speed Packet Access (HSPA+) network, a Long Term Evolution (LTE) network, a Worldwide Interoperability for Microwave Access (WiMAX) network, a 5th-generation mobile network (5G), an Internet Protocol (IP) network, a Wireless Application Protocol (WAP) network, or an IEEE 802.11 standards network, as well as any suitable combination of the above networks. In various implementations, the communications system 110 includes an optical network, a local area network, and/or a global communication network, such as the Internet.

Figure 2:
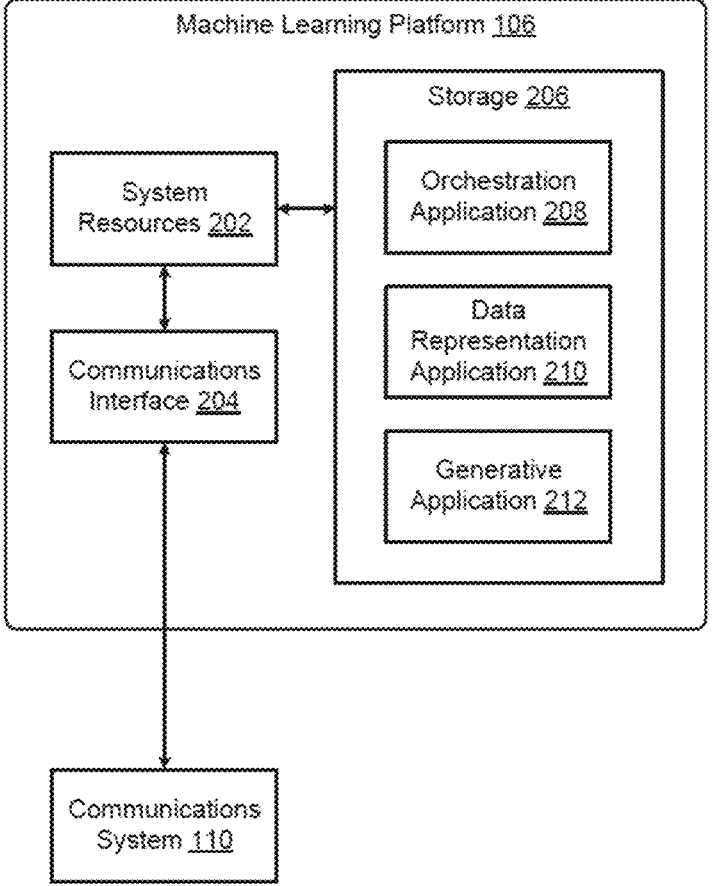
FIG. 2 is a block diagram illustrating an example machine learning platform, according to some embodiments.

FIG. 2 is a block diagram illustrating an example machine learning platform 106, according to some embodiments. The machine learning platform 106 may include system resources 202, a communications interface 204, and non-transitory computer-readable storage media, such as, for example, storage 206. The non-transitory computer-readable storage media may contain instructions that, when executed, cause an electronic processor to perform various functions described herein. In various implementations, the system resources 202 include one or more electronic processors, one or more graphics processing units, volatile computer memory, non-volatile computer memory, and/or one or more system buses interconnecting the components of the machine learning platform 106. In some examples, the communications interface 204 includes hardware and software components that communicate with other devices, platforms, and/or systems over the communications system 110. For example, the communications interface 204 may include one or more transceivers for sending and/or receiving data over the communications system 110.

In various implementations, the storage 206 includes an orchestration application 208, a data representation application 210, and/or a generative application 212. The orchestration application 208 may serve as a central coordinator, managing the flow of information within the system 100 by facilitating interactions between user devices 108, the data representation application 210, the generative application 212, and/or other components of the system 100. In various implementations, the orchestration application 208 facilitates seamless coordination and interactions within the system 100 by serving as a central coordinator for AI agents, which facilitates automated decision-making and task execution, ensuring efficient information exchange and optimized system operations. For example, the orchestration application 208 may generate a graphical user interface (GUI) that allows the user devices 108 to interact with the machine learning platform 106. Through the GUI, users can provide various types of inputs representing queries (such as text, voice, natural language queries, and/or files) to the machine learning platform 106. Additionally, the GUI may allow user devices 108 to access outputs generated by the machine learning platform 106, such as newly generated computer architecture designs, responses to queries about existing architectures, and/or relevant artifacts retrieved based on the user inputs.

The data representation application 210 may retrieve artifacts from the artifact data stores 102 and provide the retrieved artifacts to an embedding model to generate artifact embeddings. An embedding may be a mathematical representation of one or more objects (such as text, images, and/or other types of data) in a continuous high-dimensional vector space. Embeddings may capture the semantic properties of the objects they represent. For example, embeddings representing words may place words having similar semantic meanings close to one another in the vector space of the embeddings. The data representation application 210 may also provide user inputs or queries (for example, received via the GUI generated by the orchestration application 208) to the embedding model to generate query embeddings.

In various implementations, the embedding model includes a shallow neural network-based architecture, such as Word2Vec. Word2Vec operates using two training approaches: Continuous Bag of Words (CBOW) and Skip-gram. CBOW predicts a target word based on the surrounding context, while Skip-gram predicts context words given a target word. This architecture embeds text by learning vector representations for each word in the corpus, where the proximity of vectors in the high-dimensional space reflects the similarity of word meanings.

In some examples, the embedding model includes a matrix factorization-based model, such as GloVe (Global Vectors for Word Representation). GloVe leverages global word co-occurrence statistics to embed words. The architecture constructs a matrix representing word co-occurrence and factorizes it to learn vector representations for words. The embeddings capture semantic relationships between words based on their co-occurrence across the entire corpus, providing meaningful word vectors that reflect global context.

In various implementations, the embedding model includes a shallow neural network that incorporates subword information, such as FastText. FastText builds on Word2Vec by breaking words into character n-grams and embedding these subword units, which allows the model to handle out-of-vocabulary words more effectively. This architecture generates word embeddings by combining the vectors for the individual character n-grams, capturing finer-grained semantic information, especially for morphologically rich languages.

In some examples, the embedding model includes a bidirectional LSTM-based model, such as ELMo (Embeddings from Language Models). ELMo generates contextual word embeddings by processing the text using bidirectional Long Short-Term Memory (LSTM) layers. Unlike static models, ELMo's architecture embeds text by producing different word vectors depending on the word's role within the sentence. This enables the model to capture rich contextual information, making the embeddings highly sensitive to the meaning and usage of words in context.

In various implementations, the embedding model includes a transformer-based architecture, such as BERT (Bidirectional Encoder Representations from Transformers). BERT utilizes a bidirectional transformer, which processes the entire text in both directions to generate contextual embeddings. The model embeds text by creating word vectors based on the word's relationships to all other words in the sentence, allowing it to capture nuanced, context-dependent meanings. BERT is particularly effective in tasks that require deep semantic understanding.

In some examples, the embedding model includes an autoregressive transformer architecture, such as GPT. GPT generates embeddings by predicting the next word in a sequence based on the context of the preceding words. This unidirectional approach produces word embeddings that capture forward context, making it suitable for tasks like text generation. The embeddings generated by GPT evolve as more text is processed, reflecting the changing context of the generated text.

In various implementations, the embedding model includes an encoder-decoder transformer architecture, such as T5 (Text-to-Text Transfer Transformer). T5 converts all NLP tasks into a text-to-text format, embedding text by using the encoder to process the input and the decoder to generate output. The model's embeddings represent both the input and the expected task output, making it highly adaptable to diverse tasks, from text summarization to machine translation.

In some examples, the embedding model includes a transformer-based model with optimization for performance, such as ROBERTa. ROBERTa refines BERT's architecture by training on more data and using improved hyperparameters. It embeds text by creating bidirectional word representations that capture context from the entire sentence. ROBERTa's architecture builds on BERT's strength in generating rich, context-sensitive embeddings but is optimized for enhanced performance across a wide range of NLP tasks.

In various implementations, the embedding model includes a sentence-level model, such as Universal Sentence Encoder (USE). USE can use either a transformer or Deep Averaging Network (DAN) architecture. It embeds entire sentences by capturing their semantic meaning rather than word-level relationships. The model's transformer variant provides highly contextual embeddings, while the lighter DAN variant offers a more computationally efficient option for embedding sentences, balancing performance and complexity based on task requirements.

In various implementations, the data representation application 210 generates one or more knowledge graphs based on the retrieved artifacts. For example, the data representation application 210 may build nodes representing the artifacts or portions of artifacts, establish hierarchical relationships between the nodes, and create semantic relationships between the nodes. The data representation application 210 may build nodes by extracting entities from structured, semi-structured, or unstructured data in the artifact data stores 102 and representing the extracted entities on a knowledge graph. Entities may represent individual artifacts and/or portions of artifacts. The knowledge graph may capture the hierarchical and semantic relationships between the entities.

Structured data may include formats such as relational databases, spreadsheets, tabular data, etc. In various implementations, the data representation application 210 applies schema mapping and parsing techniques, SQL queries and/or API call techniques, ontology-based alignment techniques, and rule-based extraction techniques to extract entities from structured data. In some examples, the data representation application 210 applies XPath or JSONPath querying techniques, template-based and rule-based parsing techniques, regular expression techniques, and/or schema alignment techniques to extract entities from semi-structured data. In various implementations, the data representation application applies named entity recognition (NER) models (e.g., fine-tuned BERT or ROBERTa models, SpaCy-based models), semantic role labeling (SRL) techniques, keyphrase extraction techniques (e.g., RAKE, TF-IDF, embedding-based approaches), and transformer-based deep learning models (e.g., GPT or T5 models) to extract entities from unstructured data.

The data representation application 210 may establish hierarchical relationships between the nodes by organizing the nodes into levels. For example, nodes at a higher level may be "parents," while nodes at a lower level may be "children." Thus, the nodes at the higher level may govern the nodes at the lower level, and the nodes at the lower level may depend from the nodes at the higher level. In various implementations, the data representation application 210 establish the hierarchical techniques between the nodes using dependency parsing techniques, document structure analysis techniques, hierarchy clustering models, ontology-based mapping techniques, knowledge graph libraries, etc.

In various implementations, the data representation application 210 applies dependency parsing techniques to analyze syntactic relationships in text to identify hierarchical connections, such as parent-child dependencies, based on grammatical structure. In some examples, the data representation application 210 uses document structure analysis techniques to extract hierarchical relationships by leveraging structural cues, such as headings, subheadings, and formatting styles, to organize entities into logical levels based on a document's layout. In various implementations, the data representation application 210 employs hierarchical clustering models to group entities into a tree-like structure based on similarity measures. These models iteratively merge related entities, creating nested hierarchies that reflect the natural relationships within the data.

In some examples, the data representation application 210 applies ontology-based mapping techniques, using frameworks like the Web Ontology Language (OWL) to define edges, which may represent semantic relationships between nodes. Edges may capture connections between nodes (e.g., relationships between documents or portions of documents represented by nodes), and the establishment of edges may be governed by rules and/or naming conventions defined in OWL. OWL facilitates logical consistency by defining the rules for creating semantic relationships (e.g., edges) and/or naming the relationship types. Hierarchies are maintained for organizing content within a single document (e.g., sections, sub-sections, sub-sub-sections, etc.). However, when content spans across documents, semantic relationships may be established using natural language processing (NLP) techniques, with these relationships represented as edges in the knowledge graph.

In various implementations, the data representation application 210 leverages knowledge graph libraries to define and manage hierarchical and/or edge relationships in knowledge graphs. These libraries provide APIs and query languages, such as SPARQL, to establish and manipulate parent-child connections (between the nodes) and semantic relationships (e.g., represented by edges) across data sources.

The data representation application 210 may establish semantic relationships between the nodes and build edges linking the nodes. For example, edges may be built between the nodes to capture the functional, conceptual, procedural connections, etc. between the nodes Semantic relationships may represent how artifacts or portions of artifacts relate to one another, such as dependencies, shared functionality, or complementary roles. The data representation application 210 may establish the semantic relationships using relationship extraction models, semantic similarity models, triplet extraction models, ontology-driven linking models, graph attention networks, etc.

In various implementations, the data representation application 210 uses relationship extraction models to identify semantic relationships between entities. These models analyze text or structured data to detect relationships such as "uses," "depends on," or "enables," providing a basis for defining connections between nodes in the knowledge graph. Using a semantic connections method, connections between nodes may be established by satisfying predefined rules, such as linking mandates to policies, policies to standards, standards to procedures, and procedures to architecture criteria. Once these rules are satisfied and a connection may be established, the relationship type (e.g., "uses,"

"depends on," or "enables") may be defined according to the OWL and added to an edge table to formalize the connection in the knowledge graph.

In some examples, the data representation application 210 applies semantic similarity models to establish relationships by comparing the contextual meaning of entities. These models, such as cosine similarity or transformer-based embedding comparisons, quantify how closely related two entities are in semantic space and define edges accordingly. In various implementations, the data representation application 210 employs triplet extraction models to construct semantic relationships in the form of subject-predicate-object triples. For example, a triplet like "Server-hosts-Application" captures the relationship between nodes and provides a structured way to populate the graph with meaningful connections.

In some examples, the data representation application 210 applies ontology-driven linking models to establish semantic relationships by leveraging domain-specific ontologies. Using frameworks like the Web Ontology Language (OWL), these models align entities with predefined concepts and relationships, ensuring logical consistency and adherence to established domain structures. In various implementations, the data representation application 210 utilizes graph attention networks (GATs) to enhance the representation of semantic relationships. GATs assign varying levels of importance to connections between nodes, refining the semantic edges in the graph by focusing on the most contextually relevant relationships.

The generative application 212 may receive artifacts, artifact embeddings, knowledge graphs or relevant portions of knowledge graphs, user queries, and/or query embeddings as inputs and generate detailed and contextually-accurate outputs based on the inputs. For example, the outputs may include generated computer architecture designs, responses to queries about existing or proposed architectures, computer code, system analysis reports, etc. The generative application 212 may include a generative model, such as a large language model (LLM).

In various implementations, the generative model includes an autoregressive transformer model. Autoregressive transformers generate text by predicting the next word in a sequence based on all previously generated words, moving one token at a time in a unidirectional fashion. The model generates coherent long-form content by learning from large amounts of text data, excelling in tasks like text generation, summarization, and dialogue creation.

In some examples, the generative model includes an encoder-decoder transformer model. This architecture consists of two components: an encoder that reads and processes the input sequence, and a decoder that generates the output sequence. The encoder-decoder model works by first encoding the entire input text bidirectionally, then the decoder produces output tokens one by one, conditioned on both the encoder's output and the previously generated tokens. This model may excel at tasks like summarization, translation, and question-answering because of its ability to understand and generate contextually relevant responses.

In various implementations, the generative model includes a BERT-like bidirectional transformer. BERT models are trained to understand the context of a word based on both its preceding and following words in a sentence, making it a bidirectional approach. BERT models can be adapted for generation tasks, especially in scenarios where deep comprehension of input text is required before producing an output, such as in text completion or comprehension tasks.

In some examples, the generative model includes a mixture of experts (MoE) model. MoE models consist of multiple "expert" sub-models, with only a subset of experts activated for each input, based on its characteristics. The model works by routing different parts of the input to different experts, improving scalability and efficiency while generating text for specific tasks. This model excels in handling diverse tasks by leveraging specialized knowledge from various expert models.

In various implementations, the generative model includes a multimodal model. Multimodal models process and generate content across multiple data types, such as text, images, and audio, by utilizing different neural architectures suited for each type of input. The architecture allows for understanding interactions between text and other modalities, making it particularly useful for generating text from images, creating captions, or conducting cross-modal reasoning.

In some examples, the generative model includes a masked language model (MLM). MLMs predict missing words in a sequence by considering the context on both sides of the masked word. In a generative context, this allows MLMs to complete text fragments based on surrounding information. This bidirectional approach makes MLMs highly effective for text filling or generating missing content in a structured output.

In various implementations, the generative model includes a sequence-to-sequence (Seq2Seq) model. Seq2Seq models are designed to map input sequences to output sequences, commonly using encoder-decoder frameworks. The architecture works by encoding the input sequence into a fixed-length context vector and then decoding it into the desired output. Seq2Seq models excel at tasks such as machine translation, summarization, and paraphrasing, where input sequences need to be transformed into meaningful output sequences.

Additional details and functionality of the orchestration application 208, data representation application 210, and generative application 212 is described with reference to FIGS. 3-11.

Figure 3:
FIG. 3 is a message sequence chart illustrating example interactions between components of a computing system as the computing system automatically stores representations of artifacts as artifact embeddings and knowledge graphs, according to some embodiments.
Figure 3:
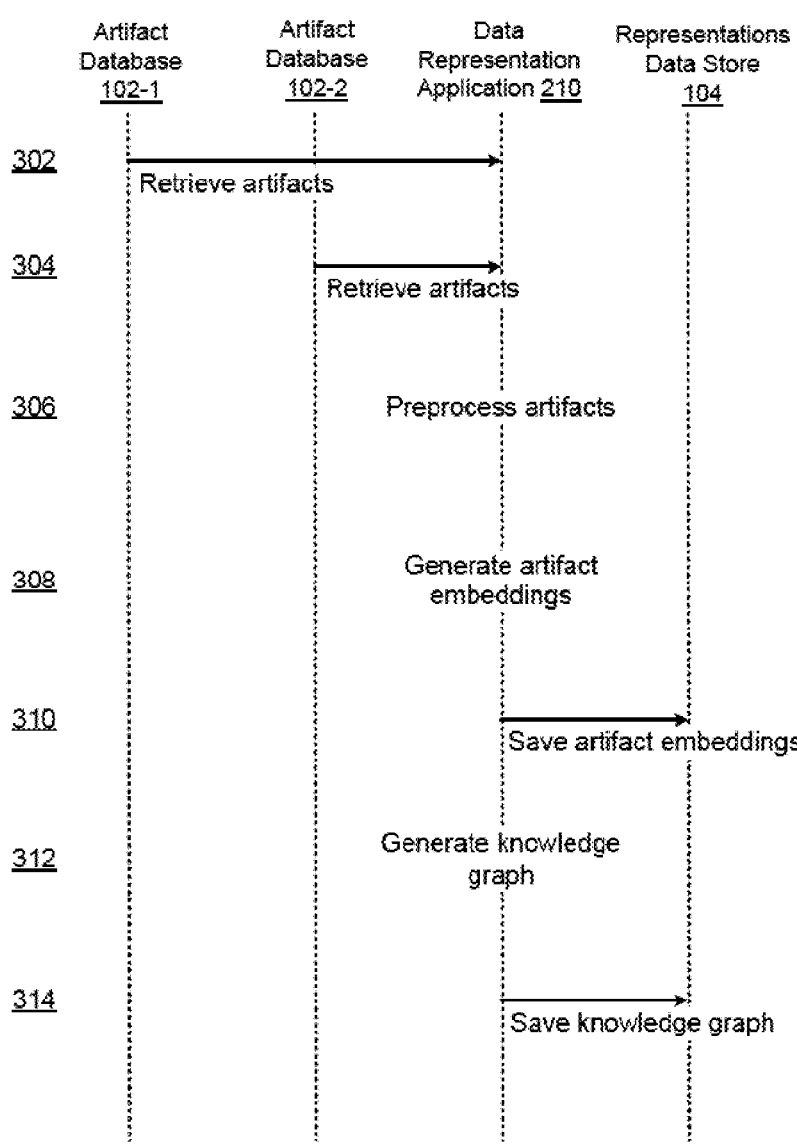

FIG. 3 is a message sequence chart 300 illustrating example interactions between components of the computing system 100 as the computing system 100 automatically stores representations of artifacts as artifact embeddings and knowledge graphs, according to some embodiments. In the example message sequence chart 300, the data representation application 210 retrieves artifacts from the artifact data stores 102. For example, in implementations where the artifact data stores 102 include artifact data stores 102-1 and 102-2, the data representation application 210 retrieves artifacts from the artifact data store 102-1 (at operation 302) and/or from the artifact data store 102-2 (at operation 304). In the example message sequence chart 300, the data representation application 210 preprocesses the retrieved artifacts (at operation 306). In various implementations, the data representation application 210 preprocesses the retrieved artifacts according to the process described with reference to FIGS. 4 and 5.

Figure 4:
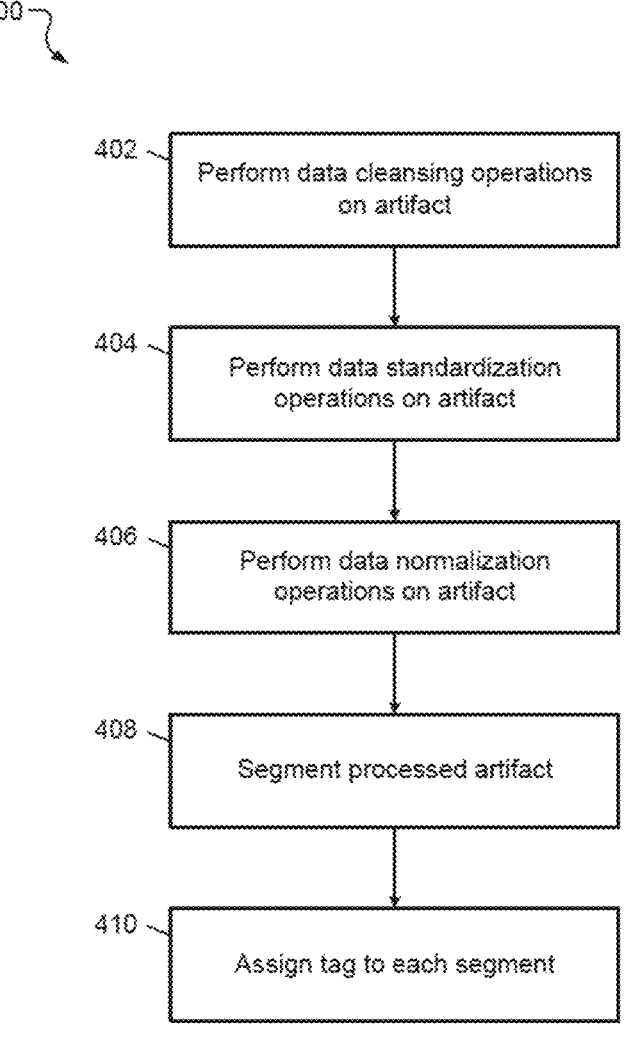
FIG. 4 is a flowchart illustrating an example data extraction process for importing artifacts into a representations data store, according to some embodiments.
Figure 5:
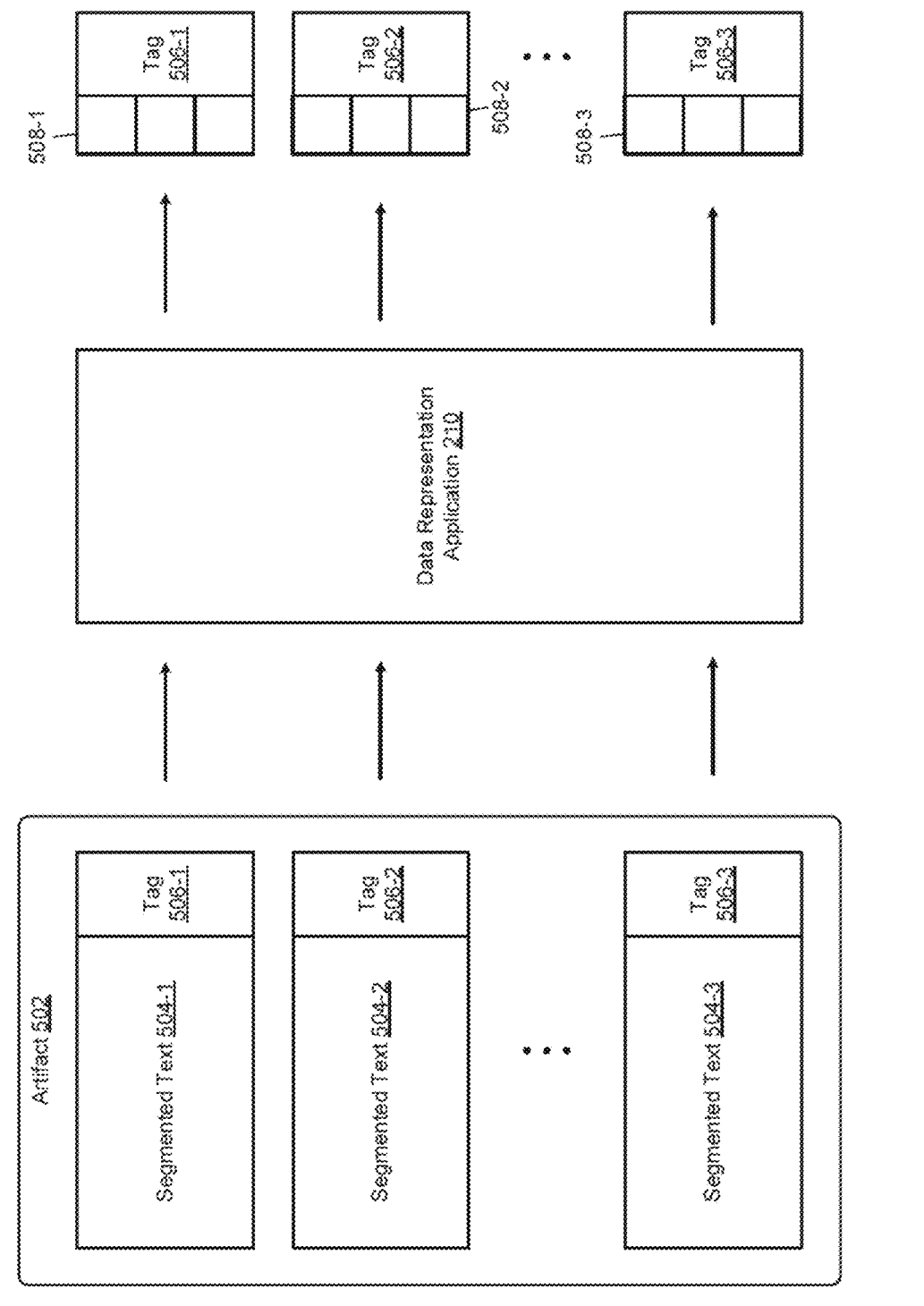
FIG. 5 is a schematic illustration of preprocessing and embedding operations performed on an artifact, according to some embodiments.

FIG. 4 is a flowchart illustrating an example data extraction process 400 for importing artifacts into the representations data store 104, according to some embodiments. FIG. 5 is a schematic illustration 500 of preprocessing and embedding operations performed on an artifact, according to some embodiments. Referring collectively to FIGS. 4 and 5, in the example process 400, the data representation application 210 performs data cleansing operations on an artifact, such as the artifact 502 illustrated in FIG. 5 (at block 402).

The data representation application 210 may perform data cleansing operations by removing inaccuracies, duplicates, and inconsistencies from the artifact 502, which may eliminate or reduce noise in the data provided by the artifact 502. Examples of data cleansing techniques include deduplication, error detection, and correction, and outlier removal. Deduplication techniques may include removing duplicate data from the artifact 502. Error detection and correction techniques may include identifying and correcting any data entry errors or discrepancies within the artifact 502. Outlier removal techniques may include detecting and removing outliers or anomalous data points from the artifact 502.

In various implementations, the data representation application 210 employs natural language processing (NLP) techniques to cleanse, enrich, and normalize data extracted from artifacts. Data cleansing operations may involve identifying entities, relationships, and metadata to create a structured representation of the information, ensuring that inaccuracies, inconsistencies, and redundancies are addressed. For example, governance policies, standards, and mandates within an artifact may be linked based on textual references and contextual patterns. Advanced NLP tasks, such as named entity recognition (NER), dependency parsing, and semantic role labeling, may be applied to enhance the semantic depth of the data by identifying and annotating relevant components and their interrelations.

In some examples, the data representation application 210 performs data normalization operations to unify data from disparate sources into a consistent format. These operations may include resolving ambiguities, standardizing terminology, filling missing fields, and addressing inconsistencies to ensure that the processed data aligns with a uniform schema. Validation pipelines may further be employed to verify the quality and integrity of the data. For instance, these pipelines may perform checks to ensure that all required fields are complete, relationships are logically consistent, and semantic annotations adhere to predefined standards before the data is passed on for further processing or analysis.

In the example process 400, the data representation application 210 performs data standardization operations on the artifact 502 (at block 404). The data representation application 210 may perform data standardization operations that convert data in the artifact 502 into a uniform format, ensuring that the data can be integrated and processed alongside with other data (for example, from other artifacts or user queries). Examples of data standardization techniques include schema alignment, unit and format conversion, and controlled vocabulary and terminology techniques. Schema alignment may include converting data from different formats or schemas into a common structure. Unit and format conversion may include ensuring that measurement units and formats within artifacts are consistent. Controlled vocabulary and terminology techniques may include aligning terminology and naming conventions so that they are consistent across artifacts.

In the example process 400, the data representation application 210 performs data normalization operations on the artifact 502 (at block 406). The data representation application 210 may perform data normalization operations that organize data within the artifact 502 into a consistent structure. Organizing data into a consistent structure promotes efficient storage and retrieval and supports processing efficiency in subsequent operations. Examples of data normalization techniques include data structuring, attribute normalization, and dimensionality reduction. Data structuring may include converting unstructured or semi-structured data into a structured format for subsequent processing. Attribute normalization may include ensuring that similar attributes across artifacts are stored in a standardized manner. Dimensionality reduction techniques may include reducing the complexity of data within the artifact 502 by filtering out or removing less relevant attributes.

In the example process 400, the data representation application 210 segments the processed artifact 502 (at block 408). The data representation application 210 may segment the processed artifact 502 by separating the artifact 502 into smaller, more manageable pieces or chunks. While three chunks of segmented text 504-1, 504-2, and 504-3 are illustrated in the example of FIG. 5, the data representation application 210 may segment the processed artifact 502 into any number of chunks as may be appropriate for the implementation.

In various implementations, the data representation application 210 applies a chunking technique. This technique segments the artifact 502 by dividing the contents of the artifact 502 into smaller, coherent sections based on logical or thematic breaks. For instance, a system architecture document could be divided into sections such as "Security Architecture," "Performance Benchmarks," and "Component Integration," with each section representing a distinct chunk of content, enabling precise downstream retrieval for specific queries.

In some examples, the data representation application 210 applies a topic-based segmentation technique. This technique segments the artifact 502 by using natural language processing (NLP) to identify distinct topics within the contents of the artifact 502. For example, a legacy system document might be segmented into sections that discuss security protocols, scalability, or compliance, so that the relevant topic-based section can be later retrieved when needed.

In various implementations, the data representation application 210 applies a sentence and paragraph segmentation technique. This technique segments the artifact 502 at a finer level by dividing the content into individual sentences or paragraphs. For instance, in a compliance document, specific sentences or paragraphs detailing encryption standards may be extracted, ensuring that only the most granular, contextually relevant information is retrieved.

In some examples, the data representation application 210 applies a structural segmentation technique. This technique segments the artifact 502 by leveraging the inherent structure of the artifact 502 (such as headings, subheadings, and lists). For example, a technical manual might be segmented by chapters, sections, or bullet points, where each major heading or section serves as a segmentation point, making it easier to retrieve content based on the document's hierarchy.

In various implementations, the data representation application 210 applies a hierarchical segmentation technique. This technique segments the artifact 502 into a multi-level hierarchy, first dividing the artifact 502 into high-level sections (e.g., chapters or major topics) and then further breaking those sections into subsections or paragraphs. For instance, a system architecture document might be first segmented by major sections like "Security" and "Performance" and then further divided into subtopics such as "Authentication Methods" or "Latency Optimization."

In some examples, the data representation application 210 applies a time-based segmentation technique. This technique segments the artifact 502 by dividing time-series data or logs based on timestamps. For example, a system log might be segmented into hourly or daily chunks, allowing the system to retrieve performance data from specific time windows, such as during a critical system failure.

In various implementations, the data representation application 210 applies a semantic segmentation technique. This technique segments the artifact 502 based on the meaning and context of the content, using NLP to detect shifts in meaning or intent. For instance, a project report may be segmented into different phases of the project, or a technical document may be divided by the discussion of various system requirements, such as scalability and fault tolerance.

In some examples, the data representation application 210 applies a length-based segmentation technique. This technique segments the artifact 502 into equal-sized chunks based on a predefined word or character count. For example, a 50,000-word technical specification may be divided into chunks of 5,000 words each, ensuring that the document is broken down into manageable segments for processing.

In various implementations, the data representation application 210 applies a rule-based segmentation technique. This technique segments the artifact 502 based on pre-defined rules or conditions, such as the presence of specific keywords or phrases. For instance, in a performance evaluation report, each time the keyword "benchmark" appears, a new segment is created, ensuring that performance-related sections are isolated for more focused downstream retrieval.

In some examples, the data representation application 210 applies a data type-based segmentation technique. This technique segments the artifact 502 based on the type of content within the artifact 502, such as text, tables, or images. For example, a technical specification may be segmented such that all text descriptions form one chunk and all tables containing quantitative data form another, allowing the system to retrieve only the tabular data when necessary.

In the example process 400, the data representation application 210 assigns a tag to each segment or chunk of the artifact 502 (at block 410). The data representation application 210 may assign a tag, such as one of tags 506-1, 506-2, and 506-3 to each chunk of segmented text 504-1-504-3 that categorizes or annotates the respective chunk, facilitating subsequent downstream retrieval of the appropriate chunk. The data representation application 210 may derive a tag 506-1-506-3 based on the contents of each respective chunk of segmented text 504-1-504-3. In various implementations, the tags 506-1-506-3 may be derived from domain-specific ontologies. In some examples, the tags 506-1-506-3 may include descriptive labels that capture key attributes and characteristics of the respective chunk of segmented text 504-1-504-3.

In various implementations, the data representation application 210 applies keyword tagging to chunks by associating key terms or phrases relevant to the content of the chunk. This technique ensures that each chunk is annotated with the most important terms identified in the text, such as tagging a chunk discussing encryption methods with keywords like "encryption," "security," and "cryptography." This facilitates downstream retrieval of the correct chunk based on keyword searches that match the query.

In some examples, the data representation application 210 applies topic-based tagging, where chunks are annotated based on broad topics or themes. NLP techniques may be used to identify the primary theme within a chunk, such as tagging a section related to performance with "latency," "throughput," or "optimization." These topic tags facilitate downstream retrieval of appropriate chunks in response to a user query of a broad subject area.

In various implementations, the data representation application 210 applies metadata tagging, adding contextual information about each chunk. This contextual information may include details such as the source, author, or creation date of the chunk. For example, a performance report might be tagged with metadata such as the report's title, the author's name, and the date of publication. Metadata tagging may facilitate advanced downstream filtering and retrieval based on the chunk's background and provenance.

In some examples, the data representation application 210 applies semantic tagging, where NLP techniques assess the meaning and context of each chunk. This method tags chunks based on the underlying concepts or ideas they represent, beyond just keywords. For instance, a chunk discussing risk mitigation in data security could be tagged with "data integrity" and "risk management," even if those exact terms are not explicitly mentioned, facilitating the downstream retrieval of relevant chunks based on the intent of a query.

In various implementations, the data representation application 210 applies ontological tagging, using a predefined ontology or hierarchical knowledge structure to tag chunks based on related concepts. For example, a chunk discussing cloud infrastructure might be tagged with terms from an ontology like "cloud computing," "virtualization," and "distributed systems." Ontological tagging helps organize content into structured categories, improving search and retrieval for queries based on these interrelated concepts.

In some examples, the data representation application 210 applies part-of-speech (POS) tagging to annotate chunks with grammatical information, identifying parts of speech such as nouns, verbs, and adjectives. For example, in a chunk discussing system performance, the term "latency" might be tagged as a noun and "optimize" as a verb, enhancing downstream linguistic analysis.

In various implementations, the data representation application 210 applies entity recognition tagging, which identifies specific entities within a chunk, such as names, dates, or technical terms. For example, a chunk discussing system requirements might have terms like "RAM" or "CPU" tagged as recognized entities, allowing more precise downstream retrieval when querying by specific technologies or system components.

In some examples, the data representation application 210 applies hierarchical tagging, which organizes tags in a nested structure, from general categories to more specific subcategories. A chunk related to system architecture might be tagged with a broad category like "system design" and then further refined with sub-tags such as "security" and "network architecture," downstream retrieval of relevant chunks based on both general and specific concepts.

In various implementations, the data representation application 210 applies sentiment-based tagging, where chunks are classified based on the tone or sentiment of the content. A chunk discussing system performance issues might be tagged as "negative" due to mentions of problems like latency or crashes. In some examples, the data representation application 210 applies contextual tagging, labeling chunks based on their relationship to surrounding content within the document. For example, a chunk on security protocols might be tagged with additional context from adjacent sections describing overall system security architecture.

Referring back to FIG. 3, in the example message sequence chart 300, the data representation application 210 generates artifact embeddings for each of the preprocessed artifact (at operation 308). In various implementations, the preprocessed artifacts are not segmented and the data representation application 210 provides the entire preprocessed artifact to an embedding model (such as one of the previously described embedding models) to generate an artifact embedding.

Referring collectively to FIGS. 3 and 5, in some examples, the preprocessed artifacts are segmented and the data representation application 210 provides each segment (such as each chunk of segmented text 504-1-504-3) to the embedding model, which generates a corresponding artifact chunk embedding 508-1, 508-2, and 508-3 for each respective chunk of segmented text 504-1-504-3. Each artifact chunk embedding 508-1-508-3 may be tagged with the same tag 506-1-506-3 associated with the respective chunk of segmented text 504-1-504-3 from which it was generated. In the example message sequence chart 300, the data representation application 210 saves the artifact embeddings to the representations data store 104 (at operation 310).

In the example message sequence chart 300, the data representation application 210 generates a knowledge graph (at operation 312). In various implementations, the data representation application 210 generates the knowledge graph based on data in the artifact data stores 102. In some examples, the data representation application 210 generates the knowledge graph based on the preprocessed artifacts (for example, generated at operation 306). In various implementations, the data representation application 210 generates the knowledge graph according to the process described with reference to FIGS. 6-9.

Figure 6:
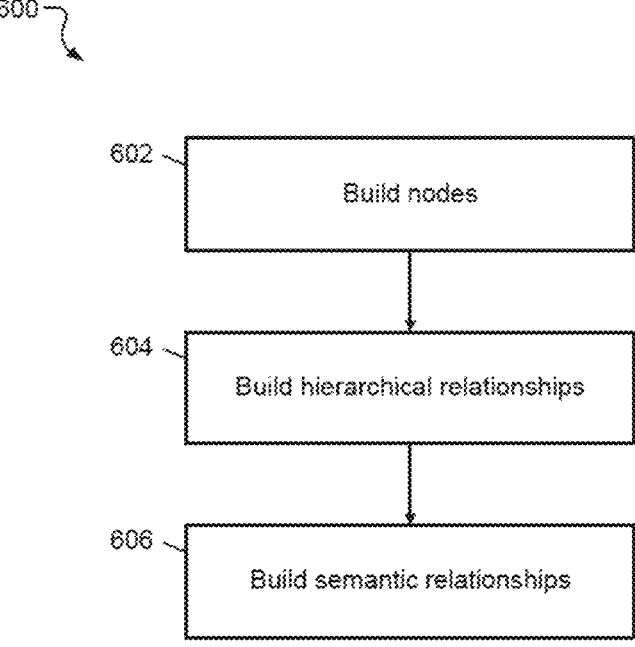
FIG. 6 is a flowchart illustrating an example process generating a knowledge graph, according to some embodiments.
Figure 7:
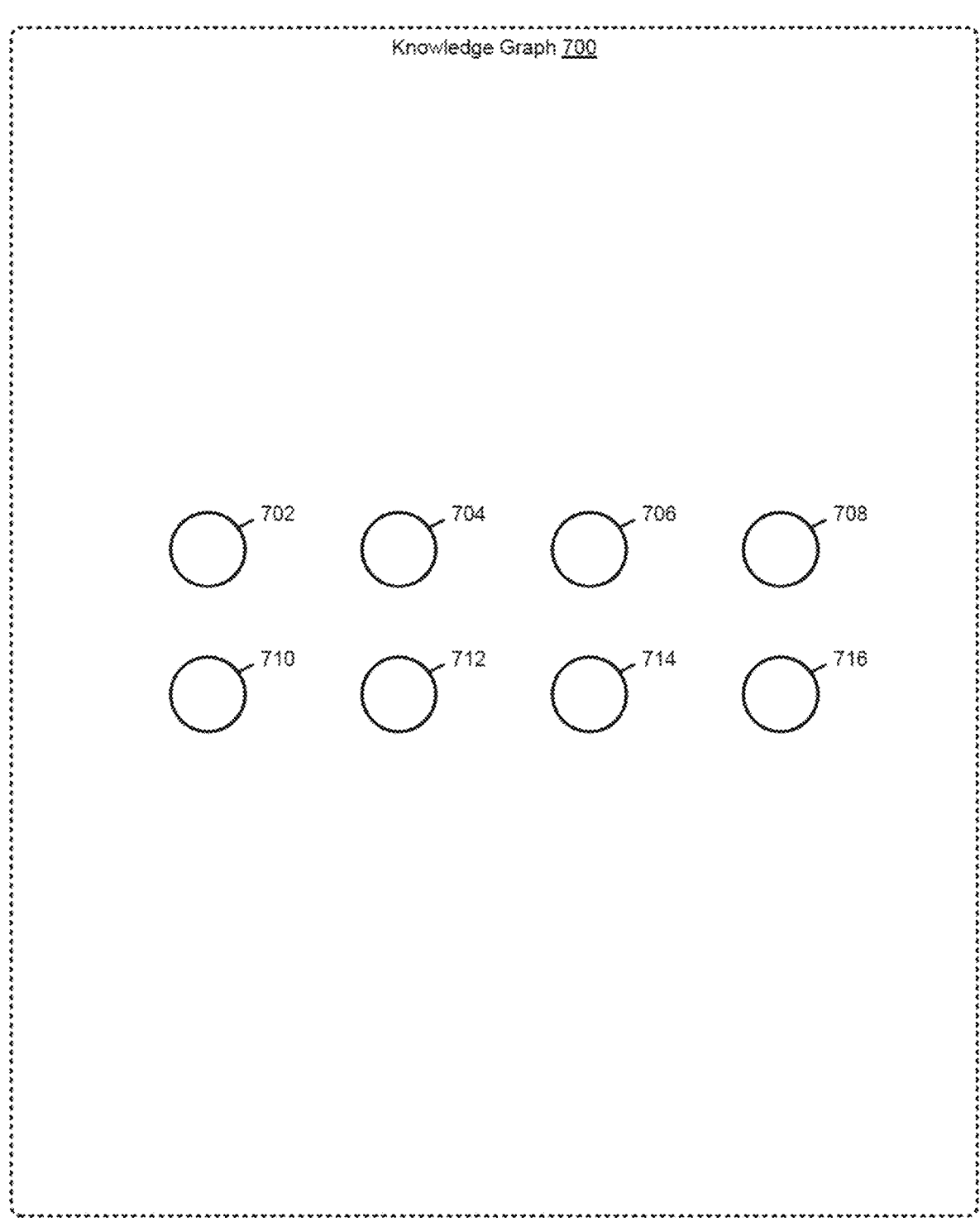
FIGS. 7-9 are schematic illustrations of a knowledge graph at various stages as the knowledge graph is generated, according to some embodiments.
Figure 8:
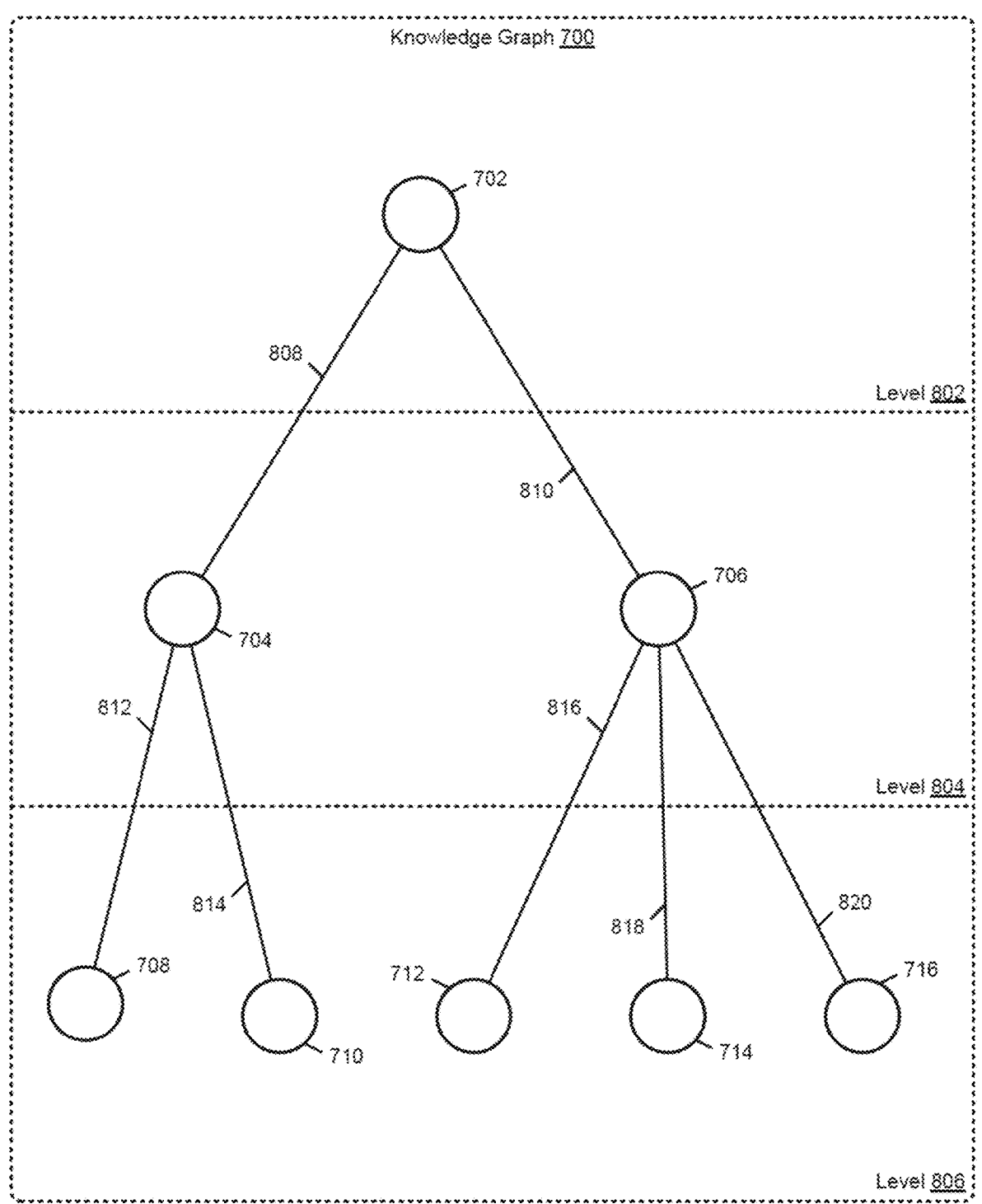
Figure 9:
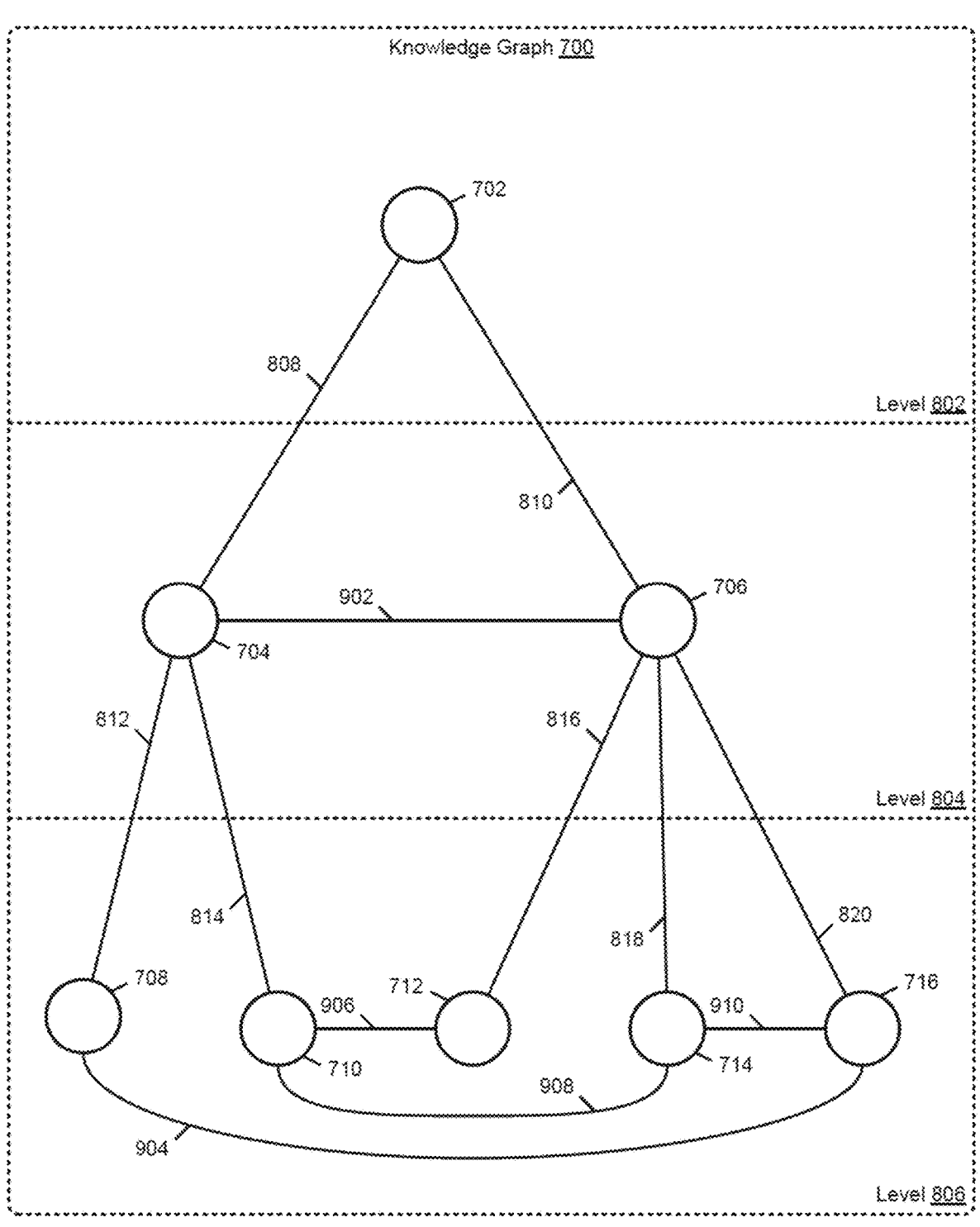

FIG. 6 is a flowchart illustrating an example process 600 for generating a knowledge graph, according to some embodiments. FIGS. 7-9 are schematic illustrations of a knowledge graph 700 at various stages as the knowledge graph 700 is generated, according to some embodiments. Referring collectively to FIGS. 6-9, in the example process 600, the data representation application 210 builds nodes (at block 602). For example, the data representation application 210 extracts entities from the data in the artifact data stores 102 or the preprocessed artifacts according to any of previously described techniques. Each entity may represent a specific artifact or a specific portion of an artifact. The data representation application 210 may add the extracted entities to the knowledge graph 700 as nodes (for example, as illustrated in FIG. 7). Each individual entity may be represented as a node, such as node 702, 704, 706, 708, 710, 712, 714, and 716. While eight nodes are illustrated in the example of FIGS. 7-9, other examples of knowledge graphs may include any number of nodes, as may be appropriate based on the number of extracted entities.

The data representation application 210 may add metadata to each node. Examples of metadata include details such as creation date of the entity, risks associated with the entity, implementation status of the entity, etc. In the example process 600, the data representation application 210 builds hierarchical relationships for the nodes (at block 604). For example, the data representation application 210 may build hierarchical relationships for the nodes according to any of the previously described techniques. In various implementations, the data representation application 210 assigns each node to a level, creating a parent-child relationships between the nodes. Nodes within a lower level may depend on nodes within a higher level. Thus, nodes within the higher level may be regarded as "parent" nodes, and nodes within the lower level may be regarded as "child" nodes.

In the example of FIG. 8, the nodes 702-708 are divided into three levels 802, 804, and 806. While three levels are illustrated in the example of FIGS. 8 and 9, other examples of knowledge graphs may include any number of levels, as may be appropriate. In the example of FIG. 8, the level 802 is the highest level and the level 806 is the lowest level. The node 702 is assigned to level 802, the nodes 704 and 706 are assigned to level 804, and the nodes 708-716 are assigned to level 806. Thus, one or more of the nodes 708-716 ("child" nodes) may depend from one or more of the nodes 704 and 706 ("parent" nodes), and one or more of the nodes 704 and 706 ("child" nodes) may depend from the node 702 ("parent" node).

The data representation application 210 may also edges to the knowledge graph 700 that link nodes. The edges may represent logical and/or functional relationships (and/or other semantic relationships) between linked nodes. For example, the data representation application 210 adds vertical edges or edges linking nodes in different levels to represent vertical or hierarchical relationships. In the example of FIG. 8, edge 808 links node 702 with node 704, edge 810 links node 702 with node 706, edge 812 links node 704 with node 708, edge 814 links node 704 with node 710, edge 816 links node 706 with node 712, edge 818 links node 706 with node 714, and edge 820 links node 706 with node 716. While FIG. 8 illustrates eight nodes linked by seven vertical or hierarchical edges, other examples of knowledge graphs may include any number of nodes linked by any number of edges, as may be appropriate for the implementation.

In the example process 600, the data representation application 210 builds semantic relationships for the nodes (at block 606). Semantic relationships may represent horizontal relationships for the nodes (e.g., connections within the same level). For example, the data representation application 210 may build semantic relationships for the nodes according to any of the previously described techniques. In various implementations, the data representation application 210 adds horizontal edges to the knowledge graph 700 that link nodes in the same level. In the example of FIG. 9, edge 902 links node 704 with node 706, edge 904 links node 708 with node 716, edge 906 links node 710 with node 712, edge 908 links node 710 with node 714, and edge 910 links node 714 with node 716. While FIG. 9 illustrates eight nodes linked by five vertical edges, other examples of knowledge graphs may include any number of nodes linked by any number of edges, as may be appropriate for the implementation.

Thus, the example knowledge graph 700 may provide a hierarchical and semantic representation of entities derived from artifacts. In the context of the knowledge graph 700, nodes may represent entities such as individual artifacts or portions of artifacts, including sections, subsections, and/or clauses of governance documents, standards, and/or technical specifications, etc. Each node may be enhanced with metadata, which may add context and semantic richness to the knowledge graph 700. This semantic enrichment facilitates downstream machine learning models in performing more precise and context-aware operations, such as querying, reasoning, and generating outputs based on the structured information encoded within the knowledge graph 700.

As previously described, the knowledge graph 700 may organize nodes into levels to capture hierarchical relationships. For example, nodes at higher levels may serve as "parent" nodes, representing overarching concepts such as entire governance documents or major sections. Nodes at lower levels may act as "child" nodes, representing specific subsections, clauses, implementation details, etc. In the example of FIG. 9, the highest level (e.g., level 802) may include a root node encompassing a governance document, while the intermediate levels (e.g., level 804) may include nodes representing major sections of the document. The lowest levels (e.g., level 806) may include nodes representing granular components such as specific subsections or clauses. These hierarchical relationships encode dependencies and structural organization, facilitating downstream machine learning models in interpreting and reasoning over complex interdependencies between entities. For instance, the hierarchical context provided by parent-child relationships may help downstream machine learning models infer cascading effects of changes to high-level policies or efficiently retrieve relevant sections of a document for a specific query.

Edges within the knowledge graph 700 may link nodes to define semantic relationships, such as "Policy governs Standard" or "Procedure implements Technology Layer." Thus, these edges may capture the functional, conceptual, or procedural connections between nodes. By encoding such relationships, the knowledge graph 700 may provide structured input that downstream machine learning models can utilize to understand and analyze how different entities relate to one another. For example, downstream machine learning models may leverage the semantic edges to perform reasoning tasks, such as identifying dependencies between policies and standards or predicting the impact of procedural changes on technical implementations.

The hierarchical and semantic structure of the knowledge graph 700, enriched with metadata and governed by ontologies, may provide downstream machine learning models with a logically consistent and contextually rich foundation. This structure may facilitate various advanced tasks, such as identifying gaps in governance frameworks, validating relationships between entities, and generating comprehensive outputs that integrate interdependent artifacts. By leveraging the structured representation of the knowledge graph 700, machine learning models may deliver more accurate, context-sensitive results that align with the underlying data and organizational requirements.

Returning to FIG. 3, in the example message sequence chart 300, the data representation application 210 saves the knowledge graph to the representations data stores 104 (at operation 314).

Figure 10:
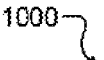
FIG. 10 is a message sequence chart illustrating example interactions between components of a computing system as the computing system automatically generates responses based on queries, according to some embodiments.
Figure 10:
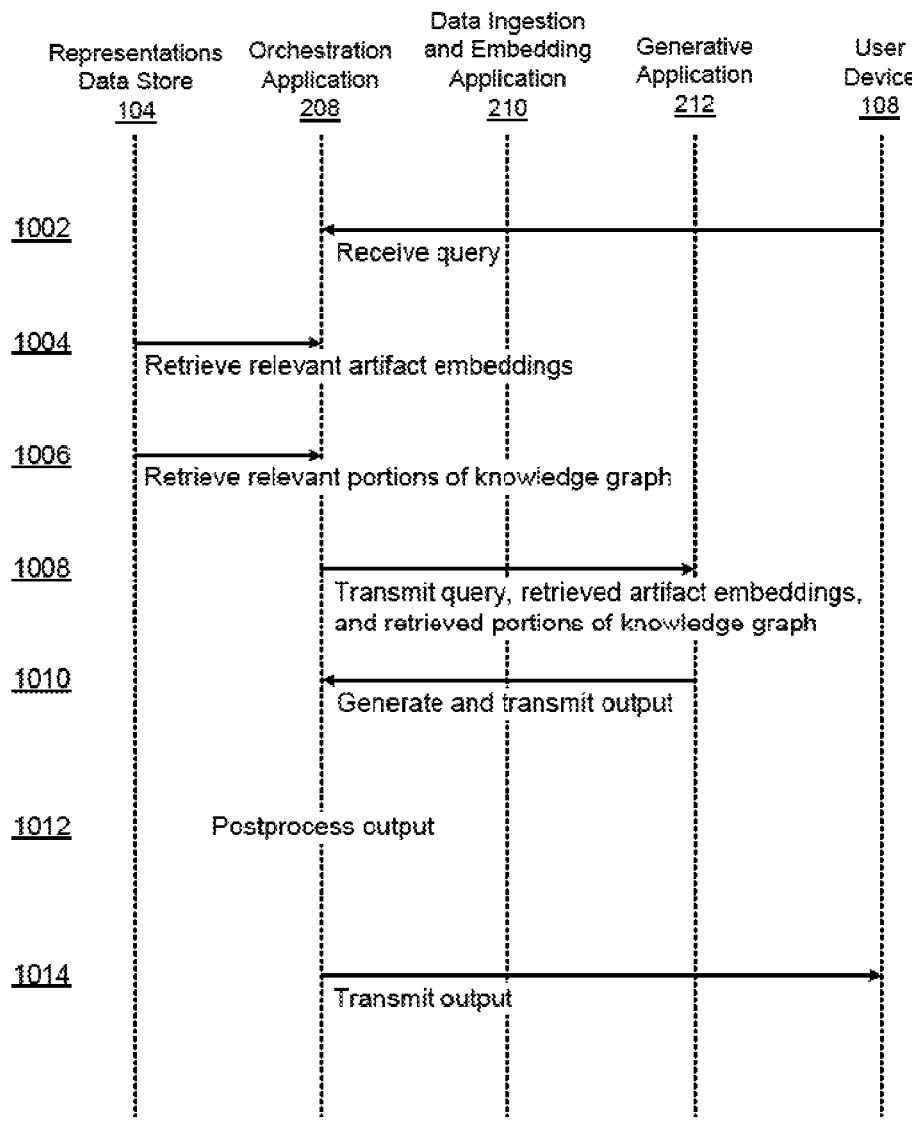

FIG. 10 is a message sequence chart 1000 illustrating example interactions between components of the computing system 100 as the computing system 100 automatically generates responses based on queries, according to some embodiments. In the example message sequence chart 1000, the orchestration application 208 receives a query from a user device 108 (at operation 1002). In various implementations, the orchestration application generates a GUI (as previously described), and the user device 108 provides the query via the GUI. In the example message sequence chart 1000, the orchestration application 208 retrieves relevant artifact embeddings from the representations data store 104 based on the query (at operation 1004). In various implementations, the orchestration application 208 identifies and retrieves relevant artifact embeddings from the representations data store 104 according to the process described with reference to FIG. 11.

Figure 11:
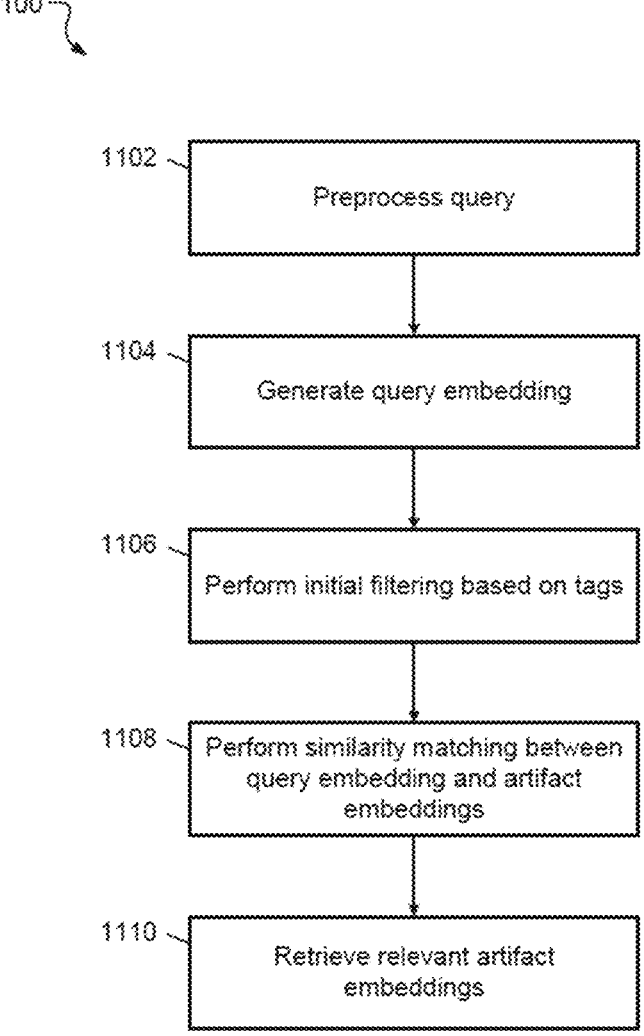
FIG. 11 is a flowchart illustrating an example process for identifying and retrieving relevant artifact embeddings based on a query, according to some embodiments.

FIG. 11 is a flowchart illustrating an example process 1100 for identifying and retrieving relevant artifact embeddings based on a query, according to some embodiments. In the example process 1100, the orchestration application 208 preprocesses the query (at block 1102). In various implementations, the orchestration application 208 applies guardrails to the input query, ensuring that that query is valid, appropriate, and within he expected scope. Guardrails may validate the query against certain constraints, such as length, format, or prohibited terms. The orchestration application 208 may prompt the user device 108 for a revised or new query if the input query violates any of the guardrails. In some examples, the orchestration application 208 preprocesses the query, for example, according to any of the previously describe preprocessing techniques. In various implementations, the orchestration application 208 provides the query to the data representation application 210, and the data representation application 210 preprocesses the query.

In the example process 1100, the orchestration application 208 provides the preprocessed query to the data representation application 210, which generates a query embedding based on the preprocessed query (at block 1104). For example, the data representation application 210 may provide the preprocessed query to the same embedding model used to generate the artifact embeddings, which generates a query embedding in the same vector space as the artifact embeddings. In various implementations, the query embedding and the artifact embeddings have the same dimensionality. Since both the query and artifact embeddings may be represented in the same vector space, a distance between the embeddings may indicate how semantically similar the embeddings are. For example, the closer the embeddings are in the vector space, the more semantically similar the embeddings may be. Conversely, the further away the embeddings are in the vector space, the more semantically dissimilar the embeddings may be.

In the example process 1100, the orchestration application 208 and/or the data representation application 210 performs an initial filtering of the artifact embeddings within the artifact data store 102 based on the tags associated with each artifact embedding (at block 1106). Initial filtering may reduce the number of artifact embeddings that need to be compared with the query embedding during subsequent processing, which may improve the computational efficiency of the retrieval process by reducing the number of artifact embeddings that need to be compared against the query embedding by more computationally expensive vector similarity matching techniques. In various implementations, the orchestration application 208 and/or the data representation application 210 identifies tags that align with or are similar to the query's semantic content and selects the artifact embeddings associated with the identified tags for similarity matching.

In the example process 1100, the orchestration application 208 and/or the data representation application 210 performs similarity matching between the query embedding and the artifact embeddings (at block 1108). In some examples, the orchestration application 208 and/or the data representation application 210 performs similarity matching between the query embedding and the artifact embeddings selected at block 1106.

In some examples, the orchestration application 208 and/or the data representation application 210 performs similarity matching between the query embedding and artifact embeddings according to cosine similarity. Cosine similarity measures the cosine of the angle between the two vectors, treating the embeddings as points in a high-dimensional space. This technique evaluates how closely the directions of the query embedding and the artifact embeddings align, with a cosine value closer to 1 indicating higher similarity. The orchestration application 208 and/or the data representation application 210 computes this similarity by comparing the dot product of the two vectors and normalizing it by the product of their magnitudes. Cosine similarity may be particularly well-suited for high-dimensional data and helps the orchestration application 208 and/or the data representation application 210 rank the artifact embeddings based on their semantic closeness to the query.

In various implementations, the orchestration application 208 and/or the data representation application 210 performs similarity matching between the query embedding and artifact embeddings according to Euclidean distance. This technique calculates the straight-line distance between the query embedding and each artifact embedding in the vector space. The smaller the distance, the closer the embeddings are in terms of similarity. Euclidean distance may be effective in capturing the overall similarity between vectors. The orchestration application 208 and/or the data representation application 210 may use Euclidean distance to assess the proximity of artifact embeddings, retrieving those closest to the query embedding in terms of vector distance.

In some examples, the orchestration application 208 and/or the data representation application 210 performs similarity matching between the query embedding and artifact embeddings according to Manhattan distance. Manhattan distance, also known as L1 distance, calculates the sum of the absolute differences between the corresponding coordinates of the query and artifact embeddings. This technique may be useful for capturing linear relationships and can provide a more interpretable measure of similarity in some cases. The orchestration application 208 and/or the data representation application 210 uses Manhattan distance to assess the similarity between vectors in a grid-like fashion, identifying the artifact embeddings with the lowest summed differences relative to the query embedding.

In various implementations, the orchestration application 208 and/or the data representation application 210 performs similarity matching between the query embedding and artifact embeddings according to Mahalanobis distance. Mahalanobis distance takes into account the correlations between the dimensions of the embeddings, providing a more accurate measure of similarity when the data has complex interdependencies. This technique adjusts the distance calculation by factoring in the covariance of the data, making it particularly effective for identifying outliers or capturing subtle differences in multi-dimensional spaces. The orchestration application 208 and/or the data representation application 210 may use Mahalanobis distance to measure the similarity between the query and artifact embeddings, especially when more nuanced similarity comparisons may be required.

In the example process 1100, the orchestration application 208 retrieves relevant artifact embeddings (at block 1110). In various implementations, after performing similarity matching at block 1108, the orchestration application 208 and/or the data representation application 210 may rank the artifact embeddings in descending order based on their similarity scores relative to the query embedding. The orchestration application 208 may retrieve the top-n artifact embeddings, where "n" is a predefined, user defined, or dynamic number that limits the results to the most relevant artifacts.

In some examples, the orchestration application 208 retrieves artifact embeddings by applying a similarity threshold, retrieving only those artifact embeddings whose similarity score exceeds a specified value (e.g., a cosine similarity score of 0.8 or higher). This ensures that only artifacts with a high degree of relevance are considered, filtering out artifact embeddings with lower similarity scores that may not be useful for the query. In various implementations, the orchestration application 208 may combine both approaches-retrieving the top-n embeddings while also ensuring that they meet or exceed the defined similarity threshold. This process may ensure that the system 100 balances relevance with computational efficiency, returning the most contextually appropriate artifact embeddings to the user.

Returning to FIG. 10, in the example message sequence chart 1000, the orchestration application 208 retrieves a knowledge graph from the representations data store 104 (at operation 1006). In various implementations, the orchestration application 208 retrieves the knowledge graph including nodes and edges representing the retrieved artifact embeddings. In some examples, the orchestration application 208 retrieves the portions of the knowledge graph including nodes and edges relevant to the query (e.g., based on a semantic similarity of the nodes and/or edges to the query).

In the example message sequence chart 1000, the orchestration application 208 transmits the query (and/or query embedding), the retrieved artifact embeddings, and/or the retrieved knowledge graph (or portion of a knowledge graph) to the generative application 212 (at operation 1008). The generative application 212 processes the query (and/or query embedding), the retrieved artifact embeddings, and/or the retrieved knowledge graph (or portion of a knowledge graph) to generate an output, which the generative application 212 transmits to the orchestration application 208 (at operation 1010). In various implementations, the output includes information related to a computer architecture, such as an existing computer architecture or a new computer architecture. In some examples, the output defines at least a portion of a computer architecture. In various implementations, the output includes a new artifact for a computer architecture. In some examples, the output includes at least a portion of computer code.

By receiving the query and/or query embedding, the generative model can gain an understanding of the original user intent, ensuring that any responses or generated outputs are aligned with the context and objectives of the query. Simultaneously, providing the relevant artifact embeddings allows the generative model to access the precise and contextually relevant information from the artifact data store. This combination enables the generative model to synthesize responses that are both informed by the user's input query and enriched by the most relevant content retrieved from the artifacts, significantly improving the coherence and accuracy of the output.

Additionally, the generative model may benefit from leveraging the semantic relationships embedded in the artifact embeddings, allowing it to integrate complex, multi-faceted information into a unified response. This process reduces the likelihood of misinterpretations, as the generative model can directly reference relevant architectural designs, technical specifications, or compliance standards when generating new architectures or answering user queries. Moreover, by utilizing both the query (and/or query embedding) and the artifact embeddings, the generative model can produce comprehensive responses that not only address the immediate query but also provide additional insights or recommendations based on the broader context within the artifacts, enhancing the overall quality and utility of the generated output.

In the example message sequence chart 1000, the orchestration application 208 performs postprocessing operations on the output received from the generative application 212 (at operation 1012). For example, once the orchestration application 208 receives the output from the generative application 212, it may perform a series of postprocessing operations to ensure the quality, relevance, and compliance of the generated response. In various implementations, the orchestration application 208 applies guardrails to the output, which may be predefined constraints that help maintain the integrity of the response. These guardrails may ensure that the output is appropriate, valid, and within the expected parameters. For instance, the orchestration application 208 may enforce restrictions related to sensitive data, ensuring that the generated content does not violate privacy regulations or security protocols.

In some examples, the orchestration application 208 performs multiple levels of validation and quality assurance checks to verify the accuracy and relevance of the output. These checks may include comparing the generated output against known benchmarks, system requirements, or established best practices. The orchestration application 208 may also cross-check the output with relevant artifacts or data sources to confirm that the information provided aligns with the artifacts retrieved earlier in the process. This validation helps prevent the introduction of technical errors or inconsistencies in the generated architecture designs or recommendations.

In various implementations, the orchestration application 208 ensures that the output complies with organizational policies, standards, and procedures by applying compliance rules during postprocessing. This step verifies that the generated response adheres to legal, regulatory, and internal standards, such as industry compliance frameworks, security protocols, and architectural design guidelines. By integrating these postprocessing operations, the orchestration application 208 may enhance the overall reliability and compliance of the system 100, ensuring that the final output is both accurate and actionable for architects and users. In the example message sequence chart 1000, the orchestration application 208 transmits the output to the user device 108 (at operation 1014). In various implementations, the orchestration application 208 renders the output on the GUI, which may be accessed by the user device 108.

Thus, as illustrated in FIG. 10, in various implementations, the operations performed by components of the computing system 100 may be divided between a front end and a back end. For example, the front end may include the user device 108 and/or the orchestration application 208, which facilitates user interactions such as receiving input queries, refining prompts, and display generated responses. The back end may include components such as the artifact data stores 102, representations data store 104, data representation application 210, and/or generative application 212, which may be responsible for processing data, performing vector similarity comparisons, generating semantic knowledge graphs, and/or synthesizing query responses, as previously described. This division may facilitate the system 100 effectively handling complex data processing on the back end while maintaining a seamless and responsive experience for users on the front end.

In various implementations, a user at the front end may interact with the system 100 to input a query or refine an existing query. The user input may be processed to retrieve data from the artifact data stores 102 and/or the representations data store 104, which may include artifacts, artifact embeddings, or semantic knowledge graphs. Contextual information retrieved from semantic knowledge graphs or artifact embeddings may be incorporated into the refined query. The refined query, enriched with this context, may then transmitted to the generative application 212. The generative application 212 may utilize this input to generate a contextually accurate response or output, which is subsequently delivered to the user via the front-end interface. This process is further illustrated in FIG. 3-9, which depicts the sequence of interactions between the user interface, artifact data retrieval mechanisms, and the generative application.

Thus, the system 100 may provide technical solutions to technical challenges associated with synthesizing and integrating complex and fragmented (or siloed) data sources. For example, by delivering both relevant artifact embeddings and the knowledge graph (or portions of a knowledge graph) to the generative application 212, the generative application 212 can utilize both semantically rich information from the artifact embeddings and structurally interconnected information from the knowledge graph.

This dual-source input addresses the inherent limitations of traditional data retrieval and processing methods. Artifact embeddings, derived through high-dimensional vectorization, may represent nuanced semantic relationships between artifacts, ensuring that even artifacts with varied terminologies or formats are appropriately contextualized and retrieved. Through vector similarity comparisons, the system 100 identifies artifacts most relevant to input queries, reducing the likelihood of oversight and ensuring the inclusion of critical design elements such as compliance standards, performance benchmarks, and integration guidelines.

The knowledge graph complements this by providing a structured representation of the relationships and dependencies between artifacts and/or their components. Nodes within the graph represent artifacts or portions thereof, while edges capture semantic relationships such as dependencies, procedural hierarchies, or conceptual alignments. This structured format supports the generative application 212 in reasoning over interconnected data, inferring new relationships, and maintaining logical consistency in its outputs. The hierarchical organization ensures that parent-child dependencies and cross-artifact relationships are explicitly represented, facilitating comprehensive and scalable system designs.

Additionally, governing the knowledge graph using a standardized ontology promotes logical consistency, traceability, and adaptability. Logical consistency ensures that relationships between artifacts adhere to predefined rules and structures, eliminating ambiguities and reducing the risk of misinterpretation. Traceability provides users with a clear lineage of relationships or design decisions, simplifying compliance and auditing workflows. Adaptability allows the generative application 212 to adjust to evolving contexts, queries, or standards, ensuring that the system remains robust and effective over time.

By combining the semantic depth of artifact embeddings with the structured interconnectivity of the knowledge graph, the system 100 addresses technical inefficiencies associated with manual synthesis and reasoning over fragmented data sources. This integration supports architects and developers in producing outputs that are not only compliant with existing standards but also optimized for integration, scalability, and technical soundness. The resulting workflows become more efficient, reducing computational and operational overhead and minimizing the risk of errors, ultimately advancing the design and implementation of robust, efficient, and innovative computer architectures.

The machine learning platform 106 may be used in a variety of practical applications. In various implementations, the machine learning platform 106 can be used to design computer architectures by analyzing functional and/or non-functional requirements. For example, the machine learning platform 106 may receive inputs specifying functional requirements such as business needs, performance metrics, and/or non-functional requirements like security concerns and scalability demands. The outputs may include a detailed computer architecture that addresses both functional and non-functional requirements, with components mapped to ensure performance, security, and scalability goals are met.

In some examples, the machine learning platform 106 can be used to retrieve relevant artifacts related to existing computer architectures and components. For example, the machine learning platform 106 may receive inputs requesting information about specific design patterns, technical specifications, or existing architecture components. The outputs may include relevant documentation, such as architecture profiles, data flow diagrams, system component models, or technical benchmarks, allowing architects to make informed decisions based on existing designs and best practices.

In various implementations, the machine learning platform 106 can be used to generate code based on design requirements or specifications. For example, the machine learning platform 106 may receive inputs specifying a set of design criteria, such as database schemas or application workflows. The outputs may include code snippets or complete code, such as SQL queries, Python scripts, or configuration files, that implement the requested design, automating tasks like database setup, business logic processing, or system deployment.

In some examples, the machine learning platform 106 can be used to perform vulnerability assessments of computer architectures by analyzing embedded artifacts related to the computer architectures (for example, stored in the artifact data stores 102). For example, the machine learning platform 106 may receive inputs in the form of embedded artifacts from the artifact data stores 102, which may include data about assets, interfaces, configuration items, etc. The generative application 212 may analyze these embedded artifacts to identify vulnerabilities and assess their impact on various computer system components. The outputs may include visual and textual representations of the vulnerabilities, highlighting the impacted areas and potential consequences. Additionally, the generative application 212 may output detailed reports that map vulnerabilities to specific assets, interfaces, and their impact levels. The generative application 212 may also output actionable recommendations for mitigating identified risks.

In various implementations, the machine learning platform 106 may be used to facilitate strategic planning by synthesizing inputs from diverse sources, such as customer requirements, organizational goals, business processes, and risks, to produce actionable and data-driven outputs. For example, the machine learning platform 106 may receive inputs specifying the need for enhanced cloud governance capabilities. The outputs may include a strategic plan detailing objectives, associated risks, and actionable steps aligned with the architect's goals. These outputs can be iteratively refined based on additional user inputs to ensure they meet the desired level of detail and alignment with the architect's objectives.

In some examples, the machine learning platform 106 can be used to create and review architectural artifacts required for governance workflows. For instance, the machine learning platform 106 may receive inputs requesting a design pattern for ETL processes. The outputs may include architecture review board (ARB) submissions, minimum viable architectures (MVAs), and reusable patterns that comply with organizational standards. By automating artifact generation and ensuring alignment with predefined guidelines, the machine learning platform 106 may streamline review processes and reduce manual effort.

In various implementations, the machine learning platform 106 can be used to automate infrastructure configurations by applying infrastructure as code (IaC) principles. For example, the machine learning platform 106 may receive inputs related to an approved ETL pattern and generate an IaC configuration that adheres to organizational standards, incorporates security controls, and optimizes performance and cost. These outputs may serve as templates for monitoring drift, managing deployments, and ensuring compliance with governance policies.

In some examples, the machine learning platform 106 can provide deployment oversight by monitoring baseline configurations, identifying deviations, and managing technical debt. For instance, the machine learning platform 106 may receive inputs related to a specific deployment and output alerts for drift from approved designs, along with recommendations for mitigation. The outputs may include analyses quantifying risks associated with technical debt and strategies for resolving discrepancies, ensuring compliance and operational integrity.

In various implementations, the machine learning platform 106 can integrate governance workflows with federated data sources using write-back functionality. For example, the machine learning platform 106 may generate a new architecture document and automatically update metadata in related architecture profiles, ARB workflows, and governance databases. The outputs may reduce manual data entry, maintain consistency across systems, and improve decision-making efficiency.

In some examples, the machine learning platform 106 can generate advanced analytics and insights tailored to governance needs. For instance, the machine learning platform 106 may receive inputs requesting a compliance report for AI governance policies. The outputs may include a report synthesizing data from semantic knowledge graphs and artifact embeddings, complete with visualizations, risk evaluations, and actionable recommendations, facilitating informed decision making by architects and other users.

In various implementations, the machine learning platform 106 may effectively function as a centralized knowledge repository for governance and development queries. For example, the machine learning platform 106 may receive inputs asking for information about the relationship between cloud governance policies and various standards. The outputs may include dynamically retrieved and contextually relevant insights derived from semantic knowledge graphs and artifact embeddings, facilitating accurate and efficient responses to user queries.

The foregoing description is merely illustrative in nature and does not limit the scope of the disclosure or its applications. The broad teachings of the disclosure may be implemented in many different ways. While the disclosure includes some particular examples, other modifications will become apparent upon a study of the drawings, the text of this specification, and the following claims. In the written description and the claims, one or more processes within any given method may be executed in a different order—or processes may be executed concurrently or in combination with each other—without altering the principles of this disclosure. Similarly, instructions stored in a non-transitory computer-readable medium may be executed in a different order—or concurrently—without altering the principles of this disclosure. Unless otherwise indicated, the numbering or other labeling of instructions or method steps is done for convenient reference and does not necessarily indicate a fixed sequencing or ordering.

It should also be noted that a plurality of hardware and software-based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software-based devices, as well as a plurality of different structural components may be utilized to implement the invention. For example, "control units" and "controllers" described in the specification can include one or more electronic processors, one or more memories including a non-transitory computer-readable medium, one or more input/output interfaces, and various connections (for example, a system bus) connecting the components.

Unless the context of their usage unambiguously indicates otherwise, the articles "a," "an," and "the" should not be interpreted to mean "only one." Rather, these articles should be interpreted to mean "at least one" or "one or more." Likewise, when the terms "the" or "said" are used to refer to a noun previously introduced by the indefinite article "a" or "an," the terms "the" or "said" should similarly be interpreted to mean "at least one" or "one or more" unless the context of their usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable connections or links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

Spatial and functional relationships between elements—such as modules—are described using terms such as (but not limited to) "connected," "engaged," "interfaced," and/or "coupled." Unless explicitly described as being "direct," relationships between elements may be direct or include intervening elements. The phrase "at least one of A, B, and C" should be construed to indicate a logical relationship (A OR B OR C), where OR is a non-exclusive logical OR, and should not be construed to mean "at least one of A, at least one of B, and at least one of C." The term "set" does not necessarily exclude the empty set. For example, the term "set" may have zero elements. The term "subset" does not necessarily require a proper subset. For example, a "subset" of set A may be coextensive with set A, or include elements of set A. Furthermore, the term "subset" does not necessarily exclude the empty set.

In the figures, the directions of arrows generally demonstrate the flow of information—such as data or instructions. The direction of an arrow does not imply that information is not being transmitted in the reverse direction. For example, when information is sent from a first element to a second element, the arrow may point from the first element to the second element. However, the second element may send requests for data to the first element, and/or acknowledgements of receipt of information to the first element. Furthermore, while the figures illustrate a number of components and/or steps, any one or more of the components and/or steps may be omitted or duplicated, as suitable for the application and setting.

Additionally, operations (such as processes, decisions, inputs, outputs, actions, messages, interactions, events, and/or any other operations) shown in the flowcharts and/or message sequence charts may be illustrated once each and in a particular order in the drawings. However, in various implementations, the operations may be reordered and/or repeated as may be suitable. In some examples, different operations may be performed in parallel, as may be appropriate.

The term computer-readable medium does not encompass transitory electrical or electromagnetic signals or electromagnetic signals propagating through a medium—such as on an electromagnetic carrier wave. The term "computer-readable medium" is considered tangible and non-transitory. The functional blocks, flowchart elements, and message sequence charts described above serve as software specifications that can be translated into computer programs by the routine work of a skilled technician or programmer.

What is claimed is:

1. A system, comprising:
non-transitory computer-readable media storing instructions; and
an electronic processor configured to execute the instructions to:
  receive a query from a user device,
  generate a query embedding based on the query,
  select artifact embeddings from a set of artifact embeddings based on a closeness between each artifact embedding and the query embedding, the query embedding and the set of artifact embeddings being in a same feature space,
  retrieve a knowledge graph from a data store, the knowledge graph including nodes representing artifacts corresponding to the selected artifact embeddings and edges representing semantic relationships between the artifacts,
  provide an input including a representation of the query, the selected artifact embeddings, and the knowledge graph to a generative model to generate an output,
  perform a postprocessing operation on the output by comparing the output with the selected artifact embeddings to determine whether the output aligns with the selected artifact embeddings, and
  in response to determining that the output aligns with the selected artifact embeddings, transmit the output to the user device.

2. The system of claim 1, wherein the electronic processor is further configured to execute the instructions to:

select a subset of the set of artifact embeddings based a tag of each artifact embedding; and select artifact embeddings from the subset of artifact embeddings based on a closeness between each artifact embedding in the subset of artifact embeddings and the query embedding.

3. The system of claim 2, wherein the electronic processor is further configured to execute the instructions to select the subset of the set of artifact embeddings based on a similarity between the tag of each artifact embedding and a semantic content of the query.

4. The system of claim 1, wherein the electronic processor is further configured to execute the instructions to:

segment each artifact in a set of artifacts into one or more chunks;

generate a chunk embedding based on each chunk; and assign a tag to each chunk embedding.

5. The system of claim 4, wherein the electronic processor is further configured to execute the instructions to assign the tag to each chunk embedding based on a semantic content of the respective chunk.

6. The system of claim 1, wherein each artifact embedding in the set of artifact embeddings is generated based on an artifact related to a computer architecture.

7. The system of claim 1, wherein each artifact embedding in the set of artifact embeddings is generated based on an artifact defining at least a portion of a computer architecture.

8. The system of claim 1, wherein the output defines at least a portion of a computer architecture.

9. The system of claim 1, wherein the output includes an artifact defining at least a portion of a computer architecture.

10. The system of claim 1, wherein the output includes at least a portion of computer code.

11. A method, comprising:

receiving, with a machine learning platform, a query from a user device;

generating, with the machine learning platform, a query embedding based on the query;

selecting, with the machine learning platform, artifact embeddings from a set of artifact embeddings based on a closeness between each artifact embedding and the query embedding, the query embedding and the set of artifact embeddings being in a same feature space;

retrieving, with the machine learning platform, a knowledge graph from a data store, the knowledge graph including nodes representing artifacts corresponding to the selected artifacts and edges representing semantic relationships between the artifacts;

providing, with the machine learning platform, an input including a representation of the query, the selected artifact embeddings, and the knowledge graph to a generative model to generate an output;

performing, with the machine learning platform, a post-processing operation on the output by comparing the output with the selected artifact embeddings to determine whether the output aligns with the selected artifact embeddings;

transmitting, with the machine learning platform, the output to a user device.

12. The method of claim 11, further comprising:

selecting, with the machine learning platform, a subset of the artifact embeddings based on a tag of each artifact embedding; and selecting, with the machine learning platform, artifact embeddings from the subset of artifact embeddings based on a closeness between each artifact embedding in the subset of artifact embeddings and the query embedding.

13. The method of claim 12, further comprising selecting, with the machine learning platform, the subset of the set of artifact embeddings based on a similarity between the tag of each artifact embedding and a semantic content of the query.

14. The method of claim 11, further comprising:

segmenting, with the machine learning platform, each artifact in a set of artifacts into one or more chunks;

generate, with the machine learning platform, a chunk embedding based on each chunk; and assign, with the machine learning platform, a tag to each chunk embedding.

15. The method of claim 14, further comprising assigning, with the machine learning platform, the tag to each chunk embedding based on a semantic content of the respective chunk.

16. The method of claim 11, wherein each artifact embedding in the set of artifact embeddings is generated based on an artifact related to a computer architecture.

17. The method of claim 11, wherein each artifact embedding in the set of artifact embeddings is generated based on an artifact defining at least a portion of a computer architecture.

18. The method of claim 11, wherein the output defines at least a portion of a computer architecture.

19. The method of claim 11, wherein the output includes an artifact defining at least a portion of a computer architecture.

20. The method of claim 11, wherein the output includes at least a portion of computer code.

21. A non-transitory computer-readable storage medium comprising instructions that, when executed by an electronic processor, cause the electronic processor to:

receive a query from a user device;

generate a query embedding based on the query;

select artifact embeddings from a set of artifact embeddings based on a closeness between each artifact embedding and the query embedding, the query embedding and the set of artifact embeddings being in a same feature space;

retrieve a knowledge graph from a data store, the knowledge graph including nodes representing artifacts corresponding to the selected artifact embeddings and edges representing semantic relationships between the artifacts;

provide an input including a representation of the query, the selected artifact embeddings, and the knowledge graph to a generative model to generate an output;

perform a postprocessing operation on the output by comparing the output with the selected artifact embeddings to determine whether the output aligns with the selected artifact embeddings; and in response to determining that the output aligns with the selected artifact embeddings, transmit the output to the user device.

22. The non-transitory computer-readable storage medium of claim 21, wherein the output includes at least a portion of computer code.

* * * * *